US011317413B2

(12) United States Patent
Sundararajan et al.

(10) Patent No.: US 11,317,413 B2
(45) Date of Patent: Apr. 26, 2022

(54) DATA PACKET GROUPING FOR TRAFFIC AWARENESS IN NEW RADIO

(71) Applicant: QUALCOMM incorporated, San Diego, CA (US)

(72) Inventors: Jay Kumar Sundararajan, San Diego, CA (US); Prashanth Haridas Hande, San Diego, CA (US); Joseph Binamira Soriaga, San Diego, CA (US); Linhai He, San Diego, CA (US); Gabi Sarkis, San Diego, CA (US); Naga Bhushan, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/898,357

(22) Filed: Jun. 10, 2020

(65) Prior Publication Data

US 2020/0396739 A1    Dec. 17, 2020

Related U.S. Application Data

(60) Provisional application No. 62/860,165, filed on Jun. 11, 2019.

(51) Int. Cl.
*H04L 1/00* (2006.01)
*H04W 72/04* (2009.01)

(52) U.S. Cl.
CPC .............. *H04W 72/0466* (2013.01)

(58) Field of Classification Search
CPC ... H04L 1/0046; H04L 1/0061; H04L 1/1614; H04L 1/1887; H04L 1/00; H04L 1/16; H04L 1/18; H04W 72/0466; H04W 72/04
See application file for complete search history.

(56) References Cited

U.S. PATENT DOCUMENTS

2005/0169205 A1* 8/2005 Grilli ............... H03M 13/2703
                                                    370/313
2012/0069805 A1* 3/2012 Feuersanger ..... H04W 72/0413
                                                    370/329

(Continued)

FOREIGN PATENT DOCUMENTS

EP          3567773 A1   11/2019
WO    WO-2018053854 A1    3/2018
WO    WO-2018127179 A1    7/2018

OTHER PUBLICATIONS

International Search Report and Written Opinion—PCT/US2020/037184—ISA/EPO—Sep. 30, 2020.

*Primary Examiner* — Nathan S Taylor
(74) *Attorney, Agent, or Firm* — Holland & Hart LLP

(57) ABSTRACT

Methods, systems, and devices for wireless communications are described. A user equipment (UE) may receive an indication of a mode for processing a transport block from a base station. The UE may receive a transport block from the base station. In some examples, the transport block may include one or more code blocks in a first code block group and one or more code blocks in a second code block group and may decode the one or more code blocks in the first code block group of the transport block. In some examples, the UE may deliver, to the medium access control (MAC) layer of the UE and based on the mode for processing the transport block, the one or more decoded code blocks in the first code block group before completing the decoding of the second code block group.

28 Claims, 21 Drawing Sheets

(56) References Cited

U.S. PATENT DOCUMENTS

| | | | | |
|---|---|---|---|---|
| 2016/0344515 A1* | 11/2016 | Aiba | .................... | H04L 1/1812 |
| 2018/0278368 A1* | 9/2018 | Kim | ...................... | H04L 1/1854 |
| 2018/0278370 A1* | 9/2018 | Jeong | .................. | H03M 13/116 |
| 2019/0246378 A1* | 8/2019 | Islam | .................. | H04W 72/042 |
| 2019/0334664 A1* | 10/2019 | Guan | .................... | H04L 5/0055 |
| 2019/0364605 A1* | 11/2019 | Loehr | ............... | H04W 74/0833 |
| 2019/0386782 A1* | 12/2019 | Yang | .................... | H04L 1/1614 |
| 2020/0068608 A1* | 2/2020 | Ye | ......................... | H04W 72/04 |
| 2020/0084828 A1* | 3/2020 | Loehr | ............... | H04W 74/0833 |
| 2020/0186290 A1* | 6/2020 | Zhang | ................... | H04W 4/46 |
| 2020/0228289 A1* | 7/2020 | He | ........................ | H04L 5/0064 |
| 2020/0351023 A1* | 11/2020 | Rico Alvarino | ........ | H04L 1/189 |
| 2020/0351844 A1* | 11/2020 | Rico Alvarino | ...... | H04W 24/08 |

\* cited by examiner

DATA PACKET GROUPING FOR TRAFFIC AWARENESS IN NEW RADIO

CROSS REFERENCE

The present application for patent claims the benefit of U.S. Provisional Patent Application No. 62/860,165 by Sundararajan et al., entitled "DATA PACKET GROUPING FOR TRAFFIC AWARENESS IN NEW RADIO," filed Jun. 11, 2019, assigned to the assignee hereof, and expressly incorporated by reference herein.

TECHNICAL FIELD

The following relates generally to wireless communications, and more specifically to data packet grouping for traffic awareness in new radio (NR).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Different types of communications may entail different traffic thresholds. Some wireless communications systems (for example, NR systems supporting ultra-reliable low latency communications (URLLC), and extended reality (XR) communications, among other examples), may support high throughput and low latency communications. For example, existing wireless communications systems may receive data packets as a stream of bits, and may assign the data packets to sub-protocol data units based on the received stream of bits. Current techniques for grouping one or more transmitted packets as a file as well as for assigning received data packets to the sub-protocol data units in high throughput and low latency communications as may be implemented in, for example, an interactive video session, however, may be deficient.

SUMMARY

The described techniques relate to improved methods, systems, devices, and apparatuses that support data packet grouping for traffic awareness in new radio (NR). Generally, the described techniques provide for enhancing throughput and reducing latency in communication links in NR systems. According to one or more aspects of the present disclosure, a base station may align a sub-protocol data unit of a medium access control (MAC) layer to a code block group of a transport block. In some examples, a transport block may include a first code block group and a second code block group and the base station may configure a user equipment (UE) to deliver the first code block group to the MAC layer at the UE before decoding the second code block group, such as completing decoding of the second code block group, in the transport block. In some aspects, the base station may align a first sub-protocol data unit of the MAC layer within a first code block group and a second sub-protocol data unit of the MAC layer within a second code block group. The UE may receive the transport block including the first code block group and the second code block group and may decode the one or more code blocks in the first code block group of the transport block to decode one or more bits of the one or more code blocks in the first code block group. In some aspects, the UE may deliver, to the MAC layer of the UE, the one or more decoded bits of the one or more decoded code blocks in the first code block group before completing decoding of all the code blocks in the second code block group. In some examples, the UE may receive an indication of a mode from a base station for processing the transport block which may include a rule set for delivering the decoded code blocks, and the UE may deliver the data obtained from the one or more decoded code blocks in the first code block group to the MAC layer based on receiving the indication of the mode.

One innovative aspect of the subject matter described in this disclosure can be implemented in a method for wireless communication at a UE. The method includes receiving, from a base station, an indication of a mode for processing a transport block, in which the mode is associated with a rule set for delivering decoded code blocks to a MAC layer of the UE, receiving, from the base station, the transport block including one or more code blocks in a first code block group and one or more code blocks in a second code block group, decoding the one or more code blocks in the first code block group of the transport block to decode one or more bits of the one or more code blocks in the first code block group, and delivering, to the MAC layer of the UE and based on the mode for processing the transport block, the one or more decoded bits of the one or more decoded code blocks in the first code block group before completing the decoding of the second code block group.

Another innovative aspect of the subject matter described in this disclosure can be implemented in an apparatus for wireless communication at a UE. The apparatus includes a processor, memory coupled with the processor, and instructions stored in the memory. The instructions may be executable by the processor to cause the apparatus to receive, from a base station, an indication of a mode for processing a transport block, in which the mode is associated with a rule set for delivering decoded code blocks to a MAC layer of the UE, receive, from the base station, the transport block including one or more code blocks in a first code block group and one or more code blocks in a second code block group, decode the one or more code blocks in the first code block group of the transport block to decode one or more bits of the one or more code blocks in the first code block group, and deliver, to the MAC layer of the UE and based on the mode for processing the transport block, the one or more decoded bits of the one or more decoded code blocks in the first code block group before completing the decoding of the second code block group.

Another innovative aspect of the subject matter described in this disclosure can be implemented in an apparatus for wireless communication at a UE. The apparatus includes means for receiving, from a base station, an indication of a mode for processing a transport block, in which the mode is associated with a rule set for delivering decoded code blocks to a MAC layer of the UE, receiving, from the base station, the transport block including one or more code blocks in a first code block group and one or more code blocks in a second code block group, decoding the one or more code blocks in the first code block group of the transport block to decode one or more bits of the one or more code blocks in the first code block group, and delivering, to the MAC layer of the UE and based on the mode for processing the transport block, the one or more decoded bits of the one or more decoded code blocks in the first code block group before completing the decoding of the second code block group.

Another innovative aspect of the subject matter described in this disclosure can be implemented in a non-transitory computer-readable medium storing code for wireless communication at a UE is described. The code includes instructions executable by a processor to receive, from a base station, an indication of a mode for processing a transport block, in which the mode is associated with a rule set for delivering decoded code blocks to a MAC layer of the UE, receive, from the base station, the transport block including one or more code blocks in a first code block group and one or more code blocks in a second code block group, decode the one or more code blocks in the first code block group of the transport block to decode one or more bits of the one or more code blocks in the first code block group, and deliver, to the MAC layer of the UE and based on the mode for processing the transport block, the one or more decoded bits of the one or more decoded code blocks in the first code block group before completing the decoding of the second code block group.

One innovative aspect of the subject matter described in this disclosure can be implemented in a method for wireless communication at a base station. The method includes transmitting, to a UE, an indication of a mode for processing a transport block, in which the mode is associated with a rule set for delivering decoded code blocks to a MAC layer of the UE, determining an alignment of a sub-protocol data unit of the MAC layer based on transmitting the indication, and transmitting, to the UE and based on the alignment, a transport block including one or more code blocks in a first code block group and one or more code blocks in a second code block group.

Another innovative aspect of the subject matter described in this disclosure can be implemented in an apparatus for wireless communication at a base station. The apparatus includes a processor, memory coupled with the processor, and instructions stored in the memory. The instructions may be executable by the processor to cause the apparatus to transmit, to a UE, an indication of a mode for processing a transport block, in which the mode is associated with a rule set for delivering decoded code blocks to a MAC layer of the UE, determine an alignment of a sub-protocol data unit of the MAC layer based on transmitting the indication, and transmit, to the UE and based on the alignment, a transport block including one or more code blocks in a first code block group and one or more code blocks in a second code block group.

Another innovative aspect of the subject matter described in this disclosure can be implemented in an apparatus for wireless communication at a base station. The apparatus includes means for transmitting, to a UE, an indication of a mode for processing a transport block, in which the mode is associated with a rule set for delivering decoded code blocks to a MAC layer of the UE, determining an alignment of a sub-protocol data unit of the MAC layer based on transmitting the indication, and transmitting, to the UE and based on the alignment, a transport block including one or more code blocks in a first code block group and one or more code blocks in a second code block group.

Another innovative aspect of the subject matter described in this disclosure can be implemented in a non-transitory computer-readable medium storing code for wireless communication at a base station is described. The code includes instructions executable by a processor to transmit, to a UE, an indication of a mode for processing a transport block, in which the mode is associated with a rule set for delivering decoded code blocks to a MAC layer of the UE, determine an alignment of a sub-protocol data unit of the MAC layer based on transmitting the indication, and transmit, to the UE and based on the alignment, a transport block including one or more code blocks in a first code block group and one or more code blocks in a second code block group.

One innovative aspect of the subject matter described in this disclosure can be implemented in a method for wireless communication at a UE. The method includes receiving, from a base station, a configuration for transmitting a transport block, in which the configuration includes an alignment of sub-protocol data units and a cyclic redundancy check configuration, determining an alignment of a sub-protocol data unit of the MAC layer based on receiving the configuration, and transmitting, to the base station and based on the alignment, a transport block including one or more code blocks in a first code block group and one or more code blocks in a second code block group.

Another innovative aspect of the subject matter described in this disclosure can be implemented in an apparatus for wireless communication at a UE. The apparatus includes processor, memory coupled with the processor, and instructions stored in the memory. The instructions may be executable by the processor to cause the apparatus to receive, from a base station, a configuration for transmitting a transport block, in which the configuration includes an alignment of sub-protocol data units and a cyclic redundancy check configuration, determine an alignment of a sub-protocol data unit of the MAC layer based on receiving the configuration, and transmit, to the base station and based on the alignment, a transport block including one or more code blocks in a first code block group and one or more code blocks in a second code block group.

Another innovative aspect of the subject matter described in this disclosure can be implemented in an apparatus for wireless communication at a UE. The apparatus includes means for receiving, from a base station, a configuration for transmitting a transport block, in which the configuration includes an alignment of sub-protocol data units and a cyclic redundancy check configuration, determining an alignment of a sub-protocol data unit of the MAC layer based on receiving the configuration, and transmitting, to the base station and based on the alignment, a transport block including one or more code blocks in a first code block group and one or more code blocks in a second code block group.

Another innovative aspect of the subject matter described in this disclosure can be implemented in a non-transitory computer-readable medium storing code for wireless communication at a UE is described. The code includes instructions executable by a processor to receive, from a base station, a configuration for transmitting a transport block, in which the configuration includes an alignment of sub-protocol data units and a cyclic redundancy check configuration, determine an alignment of a sub-protocol data unit of the MAC layer based on receiving the configuration, and transmit, to the base station and based on the alignment, a transport block including one or more code blocks in a first code block group and one or more code blocks in a second code block group.

DETAILED DESCRIPTION

Figure 1:
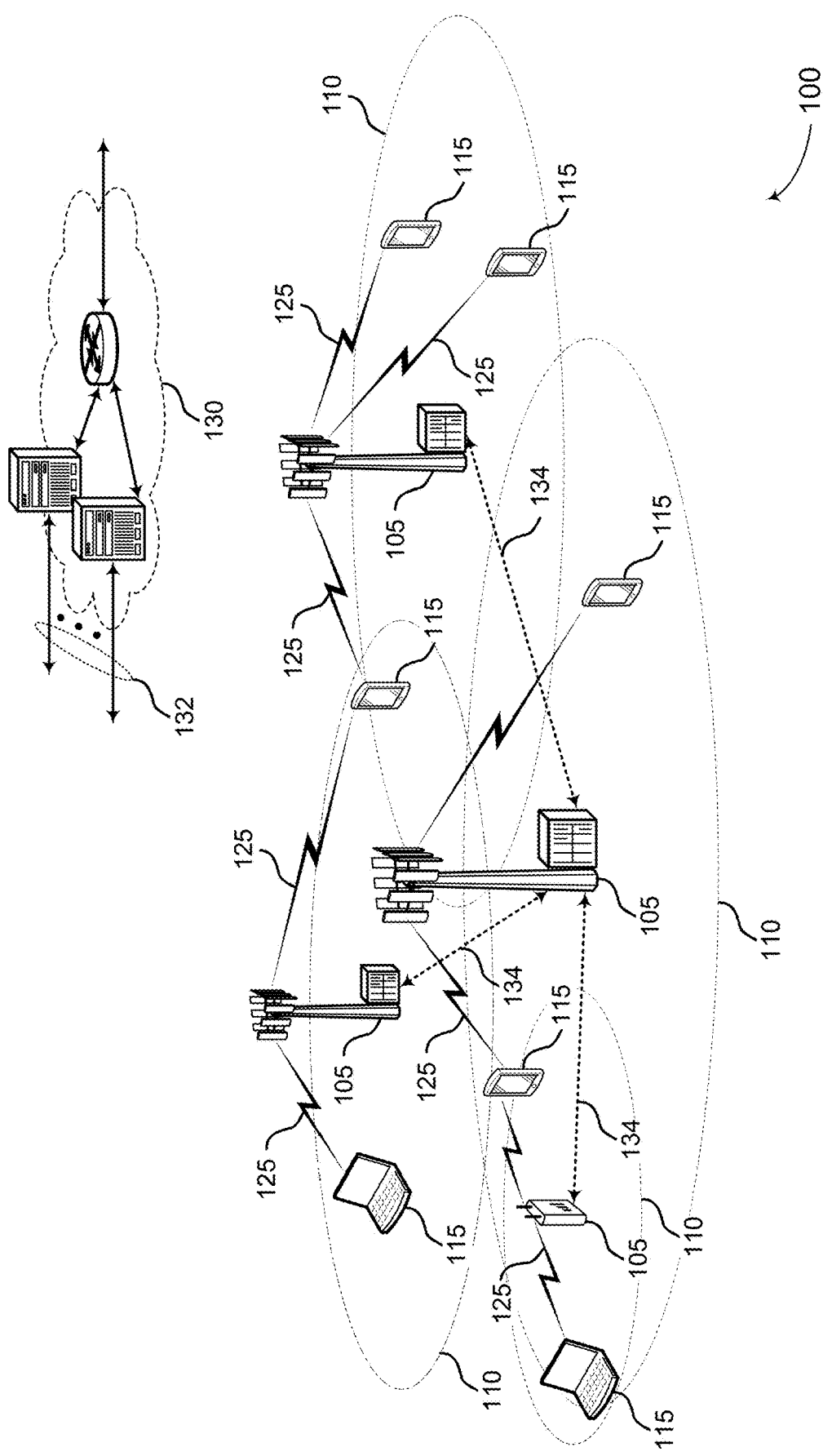
FIG. 1 illustrates an example of a wireless communications system that supports data packet grouping for traffic awareness in new radio (NR) in accordance with aspects of the present disclosure.

A user equipment (UE) in a wireless communications system, such as a New Radio (NR) system or a Long Term Evolution (LTE) system, may support communication for multiple communication devices and may further support applications associated with high throughput and low latency (for example, extended reality applications). Some techniques for supporting high throughput and low latency communications, however, may be deficient in some aspects. For example, existing wireless communications systems may receive data packets as a stream of bits, and may assign the data packets to sub-protocol data units based on the received stream of bits. Current techniques for grouping one or more transmitted data packets as a file as well as for assigning received data packets to the sub-protocol data units in high throughput and low latency communications may be deficient.

According to one or more aspects of the present disclosure, a base station may map a group of data packets to a sub-protocol data unit of a medium access layer (MAC) layer. In some examples, a transport block may include a first code block group and a second code block group. In some aspects, the base station may map one or more sub-protocol data units of the MAC layer to one or more code block groups of a transport block such that a UE can deliver the first code block group to the MAC layer of the UE before decoding the second code block group in the transport block and thereby allow the MAC layer to retrieve the transmitted sub-protocol data unit in the first code block group without waiting for the decoding of the second code block group. In some aspects, the base station may align a first sub-protocol data unit of the MAC layer within the first code block group and a second sub-protocol data unit of the MAC layer within the second code block group. For example, the base station may align the first sub-protocol data unit of the MAC layer with a boundary of the first code block group, and the second sub-protocol data unit of the MAC layer with a boundary of the second code block group.

The base station may configure the UE to deliver the first code block group to a MAC layer at the UE before decoding a second code block group. The base station may configure the UE by transmitting an indication of a mode for processing the transport block, wherein the mode is associated with a rule set for delivering decoded code blocks to the MAC layer of the UE. The UE may receive the transport block including the first code block group and the second code block group and may decode the one or more code blocks in the first code block group of the transport block to decode one or more bits of the one or more code blocks in the first code block group. In some aspects, the UE may deliver, to the MAC layer of the UE, the one or more decoded code blocks in the first code block group before completing decoding of all the code blocks in the second code block group. In some examples, the UE may receive the indication of the mode from the base station, and the UE may then deliver the data obtained from the one or more decoded code blocks in the first code block group to the MAC layer based on receiving the indication of the mode. Thus, the MAC layer of the UE may begin processing the sub-protocol data unit mapped to the first code block group before completion of a decoding operation of the second code block group.

Particular aspects of the subject matter described in this disclosure can be implemented to realize one or more of the following potential advantages. In some examples, the described techniques can be used to improve throughput and reduce latency in the communication links by allowing the decoded bits from the first code block group to be delivered to the MAC layer of the UE before the decoding of the bits in the second code block is complete. Additionally, receiving the indication of the processing mode associated with decoded block delivery rules may also improve throughput and reduce latency.

Aspects of the disclosure are initially described in the context of a wireless communications system. Aspects of the disclosure are further illustrated by and described with reference to apparatus diagrams, system diagrams, and flowcharts that relate to data packet grouping for traffic awareness in NR.

FIG. 1 illustrates an example of a wireless communications system 100 that supports data packet grouping for traffic awareness in NR in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some aspects, wireless communications system 100 may support enhanced broadband communications, ultra-reliable (for example, mission critical) communications, low latency communications, or communications with low-cost and low-complexity devices.

Base stations 105 may wirelessly communicate with UEs 115 via one or more base station antennas. Base stations 105 may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 may be able to communicate with various types of base stations 105 and network equipment including macro eNBs, small cell eNBs, gNBs, relay base stations, among other examples.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some aspects, the term "cell" may refer to a portion of a geographic coverage area 110 (for example, a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, in which the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, among other examples, which may be implemented in various articles such as appliances, vehicles, meters, among other examples.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode if not engaging in active communications, or operating over a limited bandwidth (for example, according to narrowband communications). In some aspects, UEs 115 may be designed to support critical functions (for example, mission critical functions), and a wireless communications system 100 may be configured to provide ultra-reliable communications for these functions.

In some aspects, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some aspects, groups of UEs 115 communicating via D2D communications may utilize a one-to-many (1:M) system in which each UE 115 transmits to every other UE 115 in the group. In some aspects, a base station 105 facilitates the scheduling of resources for D2D communications. In other implementations, D2D communications are carried out between UEs 115 without the involvement of a base station 105.

Base stations 105 may communicate with the core network 130 and with one another. For example, base stations 105 may interface with the core network 130 through backhaul links 132 (for example, via an S1, N2, N3, or other interface). Base stations 105 may communicate with one another over backhaul links 134 (for example, via an X2, Xn, or other interface) either directly (for example, directly between base stations 105) or indirectly (for example, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some aspects, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some aspects, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. If operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a base station 105) and a receiving device (for example, a UE 115). In some examples, the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (for example, the same codeword) or different data streams. Different spatial layers may be associated with different antenna ports used for channel measurement and reporting. MIMO techniques include single-user MIMO (SU-MIMO) in which multiple spatial layers are transmitted to the same receiving device, and multiple-user MIMO (MU-MIMO) in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying a particular amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In some examples, a base station 105 may use multiple antennas or antenna arrays to conduct beamforming operations for directional communications with a UE 115. For instance, some signals (for example, synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (for example, by the base station 105 or a receiving device, such as a UE 115) a beam direction for subsequent transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams if receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (for example, if receiving a data signal). The single receive beam may be aligned in a beam direction determined based at least in part on listening according to different receive beam directions (for example, a beam direction determined to have a highest signal strength, highest signal-to-noise ratio, or otherwise acceptable signal quality based at least in part on listening according to multiple beam directions).

In some aspects, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some aspects, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some aspects, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some aspects, UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some aspects, a wireless device may support same-slot HARQ feedback. In some examples, the device may provide HARQ feedback in a specific slot for data received in a previous symbol in the slot. In other implementations, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), in which the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol period may contain 2048 sampling periods. In some example implementations, a subframe may be the smallest scheduling unit of the wireless communications system 100, and may be referred to as a transmission time interval (TTI). In other implementations, a smallest scheduling unit of the wireless communications system 100 may be shorter than a subframe or may be dynamically selected (for example, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)), and may be positioned according to a channel raster for discovery by UEs 115. Carriers may be downlink or uplink (for example, in an FDD mode), or be configured to carry downlink and uplink communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (for example, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (for example, synchronization signals or system information) and control signaling that coordinates operation for the carrier. In some examples (for example, in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (for example, 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (for example, set of subcarriers or RBs) within a carrier (for example, "in-band" deployment of a narrowband protocol type).

In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (for example, spatial layers), and the use of multiple spatial layers may further increase the data rate for communications with a UE 115.

Devices of the wireless communications system 100 (for example, base stations 105 or UEs 115) may have a hardware configuration that supports communications over a particular carrier bandwidth, or may be configurable to support communications over one of a set of carrier bandwidths. In some examples, the wireless communications system 100 may include base stations 105 and UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some aspects, an eCC may be associated with a carrier aggregation configuration or a dual connectivity configuration (for example, if multiple serving cells have a suboptimal or non-ideal backhaul link). An eCC may also be configured for use in unlicensed spectrum or shared spectrum (for example, in which more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (for example, to conserve power).

In some aspects, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (for example, according to frequency channel or carrier bandwidths of 20, 40, 60, 80 MHz) at reduced symbol durations (for example, 16.67 microseconds). A TTI in eCC may consist of one or multiple symbol periods. In some aspects, the TTI duration (in other words the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (for example, across the frequency domain) and horizontal (for example, across the time domain) sharing of resources.

Existing wireless communications systems may receive data packets as a stream of bits, and may assign the data packets to sub-protocol data units based on the received stream of bits. For some high throughput and low latency applications, it may be beneficial to group one or more transmitted packets as a file. In some examples, packets in a video frame of an application may be included in a file, in which each file is associated with a separate video frame. Existing methods for assigning received data packets to the sub-protocol data units may however be deficient.

To overcome the limitations of existing wireless communications systems, according to one or more aspects of the present disclosure, the wireless communications system 100 may be configured to group data packets of the same video frame as a file. Additionally or alternatively, the wireless communications system 100 may be configured to align received data packets based on the grouping. For example, the base station 105 may map a group of data packets to a sub-protocol data unit of a MAC layer. The base station 105 may then map the sub-protocol data unit of the MAC layer to a code block group of multiple code block groups in a transport block and may decode a first code block group. In some aspects, the base station 105 may configure the UE 115 to deliver the decoded first code block group to the MAC layer before completing decoding one or more remaining code block groups.

In some examples, the base station 105 may transmit to the UE 115, an indication of a mode for processing a transport block. In some examples, the mode may be associated with a rule set for delivering data from decoded code blocks to a MAC layer of the UE 115. For example, the rule set may indicate a first mode, or a second mode, or a third mode to the UE 115. In some aspects, the first mode may configure the UE 115 to deliver one or more decoded bits to the MAC layer after decoding all code blocks in a transport block. In other aspects, the second mode may configure the UE 115 to deliver the decoded bits of a decoded code block (or a code block group) to the MAC layer if all prior code blocks (or a code block groups) in the transport block have been decoded. In yet other aspects, the third mode may configure the UE 115 to deliver the decoded bits of any decoded code block (or a code block group) to the MAC layer.

Figure 2:
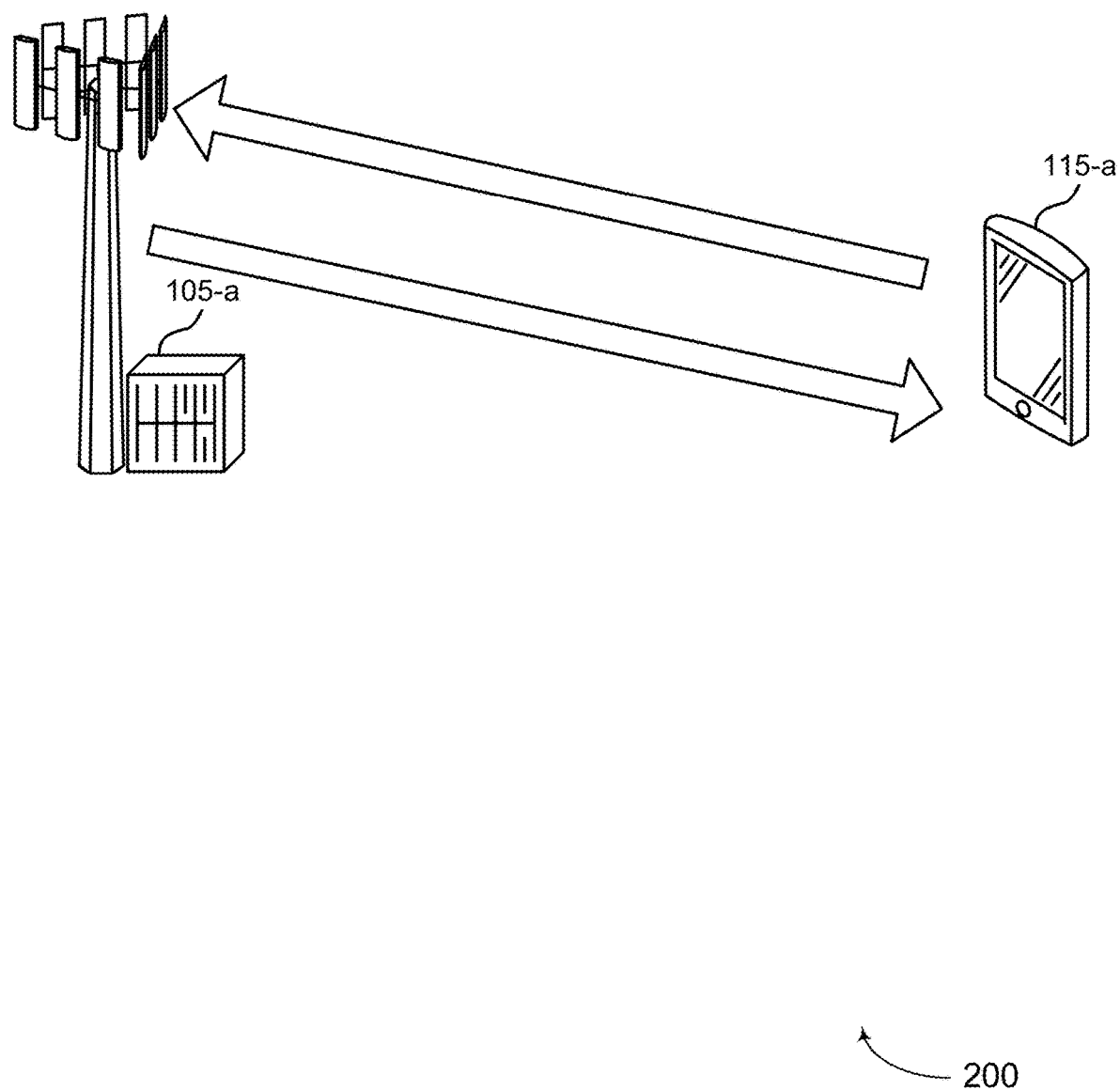
FIG. 2 illustrates an example of a wireless communications system that supports data packet grouping for traffic awareness in NR in accordance with aspects of the present disclosure.

FIG. 2 illustrates an example of a wireless communications system 200 that supports data packet grouping for traffic awareness in NR in accordance with aspects of the present disclosure. In some examples, wireless communications system 200 may implement aspects of wireless communications system 100. The wireless communications system 200 may include a base station 105-a and a UE 115-a, which may be examples of the corresponding devices as described with reference to FIG. 1. In some examples, the base station 105-a may be referred to as a transmitter and the UE 115-a may be referred to as a receiver. In some aspects, the UE 115-a and the base station 105-a may operate in a mmW spectrum or using NR technologies.

In some wireless systems (for example, NR wireless systems, such as wireless communications system 200) the UE 115-a and the base station 105-a may support low latency and high throughput communications. Different types of communications may entail different traffic thresholds. Table 1 represents a table showing the traffic thresholds for different types of traffic in an NR wireless system. For example, an NR wireless system, such as wireless communications system 200, may support eMBB applications, ultra-reliable low latency communications (URLLC), and extended reality (XR) communications. In some aspects, one or more XR applications (for example, applications using XR traffic thresholds) may include cloud reality applications, virtual reality applications, and gaming applications. As discussed herein, XR applications are associated with high throughput (for example, throughput for rendering videos) and low latency. In some aspects, XR applications may include interactive video sessions (such as gaming or head mounted display). As described with reference to Table 1, XR applications may be associated with a packet delay budget and a packet error rate. For example, an XR application (or an XR communication session) may be associated with a packet delay budget of 10 ms and a packet error rate of $10^{-6}$.

TABLE 1

| Traffic Type | 5QI Value | Packet Delay Budget | Packet Error Rate | Default Maximum Data Burst Volume | Example Services |
|---|---|---|---|---|---|
| eMBB | 1 | 100 ms | $10^{-2}$ | N/A | Conversational voice |
| eMBB | 2 | 150 ms | $10^{-3}$ | N/A | Conversational video (for example, live streaming) |
| eMBB | 6, 8, 9 | 300 ms | $10^{-6}$ | N/A | Video (for example, buffered streaming) Transmission Control Protocol-based service (for example, e-mail, chat, file transfer |

TABLE 1-continued

| Traffic Type | 5QI Value | Packet Delay Budget | Packet Error Rate | Default Maximum Data Burst Volume | Example Services |
|---|---|---|---|---|---|
| | | | | | protocol, peer-to-peer file sharing, progressive video) |
| ... | ... | ... | ... | ... | ... |
| XR | 80 | 10 ms | $10^{-6}$ | N/A | Low latency eMBB applications (such as augmented reality) |
| URLLC | 81 | 5 ms | $10^{-5}$ | 160 B | Remote control |
| ... | ... | ... | ... | ... | ... |

Additionally, Table 2 illustrates multiple use cases for XR applications. For example, an XR application may include virtual reality split rendering (for example, gaming applications). In such implementations, a head mounted display may be attached with a server that renders a video frame. In such examples, processing of the video frame may be performed at the server. Upon successful processing of the video frame, a communication link (such as a 5G communication link) may convey the processed video frame from the server to the head mounted display. For successful delivery of the processed video frame, the 5G communication link may be associated with high throughput and low latency (for example, according to a traffic threshold for XR applications). In some example implementations, a second use case for XR applications may include augmented reality split computation. In augmented reality applications, an entire view of a user may not be covered by a rendered video. Instead, a rendered video (such as, video rendered from a server) may be augmented over a display of a user device (for example, a camera feed). In some aspects, a third use case for XR applications may include cloud gaming. In some examples, cloud gaming may be associated with high throughput and low latency communication links. Thus, XR applications may be subjected to higher traffic thresholds, and it may be beneficial for the NR wireless communications system (such as wireless communications system 200) to be aware of traffic associated with XR applications.

TABLE 2

| | Virtual Reality split rendering | Augmented Reality split computation | Cloud Gaming |
|---|---|---|---|
| Head Mounted Display/ Device | Head-mounted with 5G modem attached | Head-mounted with USB/Bluetooth connection to "Puck" or Smartphone with 5G modem | 5G Smartphone or Tablet |
| 5G usage Location | QoS Enterprise-Indoor, Residential-Indoor, Outdoor | QoS Enterprise-Indoor, Outdoor | OTT/QoS Outdoor |
| Mobility | Limited to head movements and restricted body movements, Hi-speed (VR in the back of a car) | Pedestrian, Hi-speed | Static, Hi-speed |

Existing wireless communications system are configured to treat data packets as a stream of bits without the knowledge of the files associated with the packets. In some example XR applications, one or more transmitted packets may be in the form of groups or fields. In some examples, packets in a video frame in an XR application may be included in one or more files. In some examples, each separate file may be associated with a file error rate. For example, a file error rate may be based on one or more of a number of packets in each file or a reliability threshold associated with each file (for example, whether a file includes an I-frame or a P-frame). Existing wireless communications do not have a method to support a file error rate.

To overcome the limitations of existing wireless communications systems, according to one or more aspects of the present disclosure, the wireless communications system 200 may be configured to group packets of the same video frame as a file. Additionally or alternatively, the wireless communications system 200 may be configured to implement a policy on file handling. For example, the base station 105-a and the UE 115-a may determine that a file is usable if all packets of the file are received. In some aspects, the wireless communications system 200 may implement a file error rate associated with each file in an XR application. One or more aspects of the present disclosure provide for a mapping between the file error rate and the packet error rate (for example, the packet error rate defined in Table 1). In some aspects, the wireless communications system 200 may implement the mapping based on identifying a boundary of a file. Additionally, one or more aspects of the present disclosure provide for a method to increase the efficiency while processing a transport block received from the base station 105-a based on the mapping between the file error rate and the packet error rate. Specifically, one or more aspects of the present disclosure provide for a method to increase efficiency between a physical layer and a MAC layer (for example, at the UE 115-a).

Figure 3:
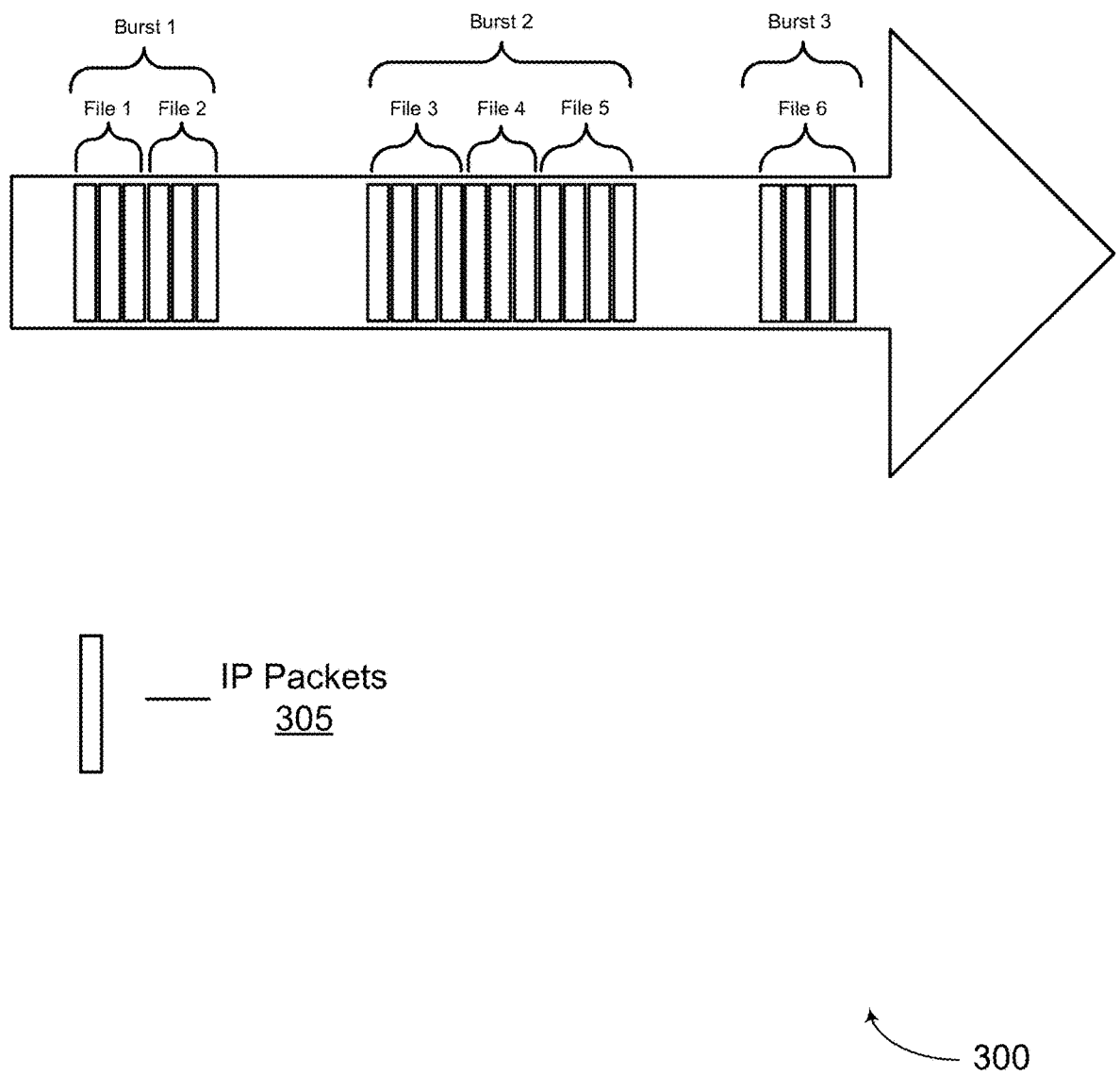
FIG. 3 illustrates an example of a traffic flow that supports data packet grouping for traffic awareness in NR in accordance with aspects of the present disclosure.

FIG. 3 illustrates an example of a traffic flow 300 that supports data packet grouping for traffic awareness in NR in accordance with aspects of the present disclosure. In some examples, the traffic flow 300 may implement aspects of wireless communications system 100 and the wireless communications system 200 as described with reference to FIG. 1 and FIG. 2.

The traffic flow 300 may include multiple IP packets 305. In some aspects, NR wireless systems (such as the wireless communications system 200 supporting XR applications) may be configured to group one or more IP packets 305 into one or more files. As described with reference to FIG. 2, the wireless communications system may group the one or more IP packets 305 based on a reliability threshold. For example, a first group of packets may be associated with an I-frame, and a second group of packets may be associated with a P-frame. In such an example, the first group of packets may have a higher reliability threshold (such as a higher priority) than the second group of packets. Additionally or alternatively, the wireless communications system may group the one or more IP packets 305 based on a delivery deadline associated with each IP packet 305. In some aspects, a delivery deadline of a packet may be interpreted as a sum of a time of arrival of the packet (for example, at a base station 105 as described with reference to FIG. 1) and a packet delay budget associated with the packet. In some examples, a group of packets having a same (or similar) delivery deadline may be grouped together as one file. In some examples, the wireless communications system may implement additional signaling to convey information related to a delivery deadline from an application to the base station 105 and a UE 115 (for example, a UE 115 as described with reference to FIG. 1). In some aspects, the wireless communications system may group the one or more IP packets 305 based on a policy of file handling. For example, the wireless communications system may include one or more IP packets 305 in a file if the file (such as a video frame) is usable at a receiver (such as the UE 115) if all IP packets are successfully received. In some examples, the wireless communications system may include one or more IP packets 305 in a file if a policy indicates that a contiguous stream of IP packets 305 up to the first packet in error can be used at the receiver.

In the example of FIG. 3, the wireless communications system generates 6 files. In some aspects, each file may include a set of IP packets 305 jointly processed by an application (such as an XR application). In some examples, the wireless communications system may determine the IP packets 305 associated with a file based on a maximum transmission unit (MTU) setting on an IP stack interfacing the application. In some examples, the wireless communications system may further fragment the IP packets 305 into smaller IP packet fragments (not shown). In some aspects, a burst of files may be referred to as files generated by an application at the same (or similar) time. As depicted in the example of FIG. 3, the wireless communications system generates File 1 and File 2 at a same (or similar) time. Accordingly, File 1 and File 2 are included in first burst (Burst 1) of the traffic flow 300. Similarly, the wireless communications system (for example, an XR application included in the wireless communications system) may generate a second burst (Burst 2) including File 3, File 4, and File 5. Additionally, the wireless communications system may generate a third burst (Burst 3) including File 6. According to one or more aspects of the present disclosure, the wireless communications system may implement a method to signal a burst start time and a burst end time to the UE 115. Specifically, the present disclosure provides for a file-based (or packet-based) mapping between a sub-protocol data unit of a MAC layer and a code block group of a transport block based on a burst start time and a burst end time.

Figure 4:
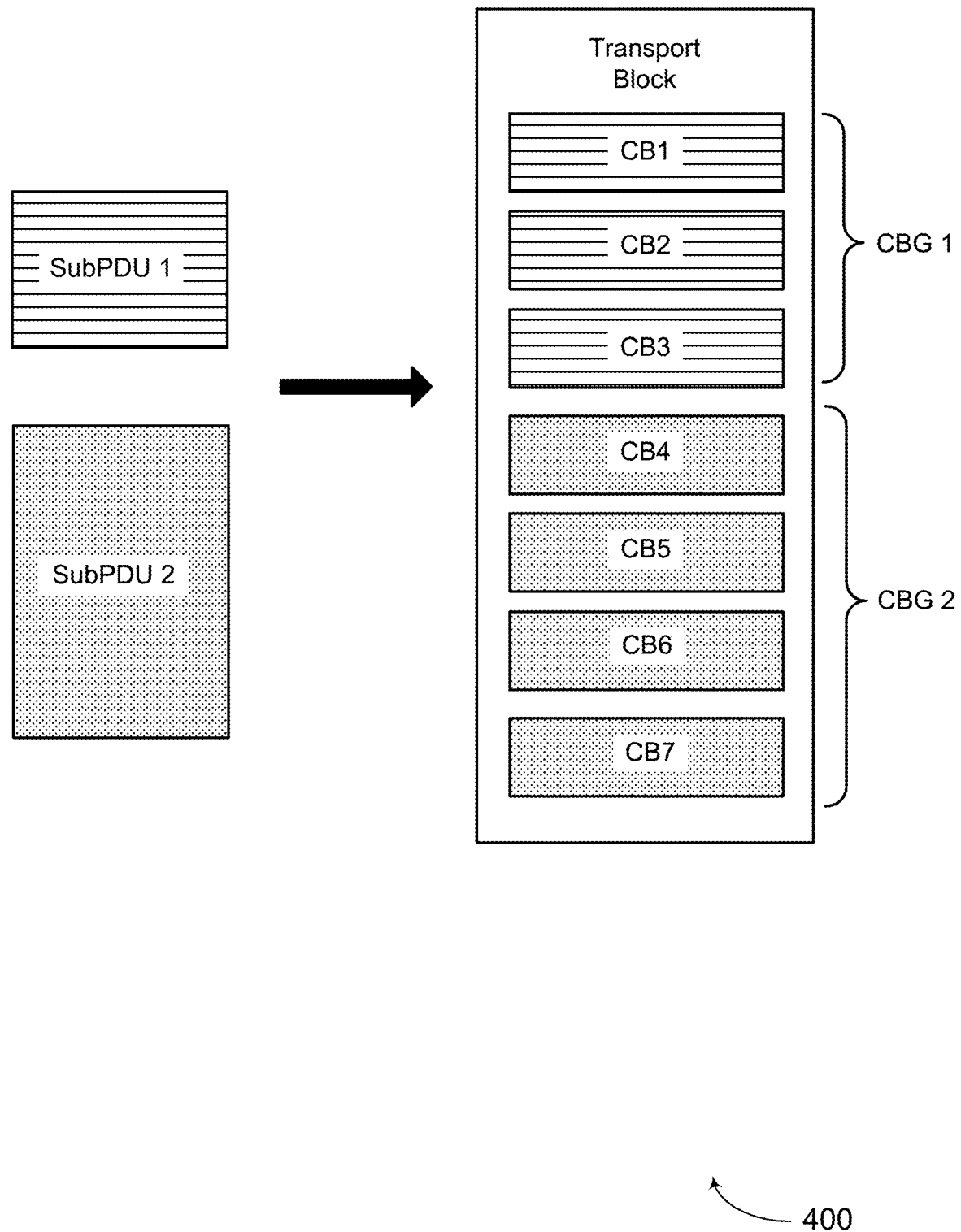
FIG. 4 illustrates an example of a mapping that supports data packet grouping for traffic awareness in NR in accordance with aspects of the present disclosure.

FIG. 4 illustrates an example of a mapping 400 that supports data packet grouping for traffic awareness in NR in accordance with aspects of the present disclosure. In some examples, the mapping 400 may implement aspects of wireless communications system 100 and the wireless communications system 200 as described with reference to FIG. 1 and FIG. 2. In the example of FIG. 4, the mapping 400 may depict an alignment of sub-protocol data units of a MAC layer with one or more code block groups in a transport block. In some examples, the mapping 400 may be implemented in an uplink transmission. Although not demonstrated in the example of FIG. 4, the mapping 400 may be implemented by a UE 115 (for example, a UE 115 as described with reference to FIG. 1). In some examples, the UE 115 may be configured to perform the methods performed by a base station 105 (for example, a base station 105 as described with reference to FIG. 1) with reference to FIG. 4.

According to one or more aspects of the present disclosure, a base station 105 may determine a mode associated with a rule set for delivering decoded code blocks to a MAC layer of a UE 115. In some examples, the rule set may indicate a first mode, or a second mode, or a third mode to the UE 115. In some aspects, the first mode may configure the UE 115 to deliver one or more decoded bits to the MAC layer after decoding all code blocks in a transport block. In some other aspects, the second mode may configure the UE 115 to deliver the decoded bits of a decoded code block (or a code block group) to the MAC layer, if all prior code blocks (or a code block groups) in the transport block have been decoded. In yet other aspects, the third mode may configure the UE 115 to deliver the decoded bits of any decoded code block (or a code block group) to the MAC layer.

In some aspects, the base station 105 may indicate the mode to the UE 115 (for example, via RRC signaling or downlink control information (DCI) signal). In some examples, the base station 105 may then determine an alignment of a sub-protocol data unit of the MAC layer based on transmitting the indication. In existing wireless communications systems, a base station may receive a data stream from an application, and may transmit the data stream in the order that it is received. According to the present disclosure, the base station 105 may map a sub-protocol data unit of the MAC layer to a code block group of a transport block such that a UE 115 can deliver the first code block group to the MAC layer before decoding a second code block group.

In some aspects, a transport block may be split into multiple code blocks (CB1, CB2, CB3, CB4, CB5, CB6, and CB7). In some examples, one or more code blocks may be grouped into a code block group. As depicted in the example of FIG. 4, CB1, CB2, and CB3 are grouped into a first code block group (CBG 1), and CB4, CB5, CB6, and CB7 are grouped into a second code block group (CBG 2). In existing communications systems, a physical layer of a UE waits for all code block groups of a transport block to be successfully decoded before delivering the decoded code block groups to the MAC layer of the UE. As such, partial delivery of the data from a transport block based on decoding a subset of the code block groups is not utilized in existing communications systems. In order to increase the efficiency and decrease the latency in communication, the one or more aspects of the present disclosure provide for a base station 105 to align a first sub-protocol data unit (SubPDU 1) of the MAC layer within a first code block group (CBG 1) and a second sub-protocol data unit (SubPDU 2) of the MAC layer within a second code block group (CBG 2). In some examples, the base station 105 may also align the first sub-protocol data unit (SubPDU 1) of the MAC layer with a boundary of the first code block group (CBG 1) and the second sub-protocol data unit (SubPDU 2) of the MAC layer with a boundary of the second code block group (CBG 2). In some examples, the base station 105 may determine that a single sub-protocol data unit of the MAC layer is fully contained within a code block group. As depicted in the example of FIG. 4, the first sub-protocol data unit (SubPDU 1) of the MAC layer is fully contained within (or spans less than or equal to) the first code block group (CBG 1) and the second sub-protocol data unit (SubPDU 2) of the MAC layer is fully contained within (or spans less than or equal to) the second code block group (CBG 2). Additionally or alternatively, the base station 105 may align a sub-protocol data unit of the MAC layer to be within a code block (such as CB1 or CB2 or CB3 or CB4 or CB5 or CB6 or CB7). In such an example, no code block may span multiple sub-protocol data units of the MAC layer (not shown).

According to one or more aspects of the present disclosure, a UE 115 may receive the transport block from the base station 105 and may decode the one or more code blocks (CB1, CB2, and CB3) in the first code block group (CBG 1) of the transport block. In some aspects, the UE 115 may deliver, to the MAC layer of the UE, the one or more decoded code blocks in the first code block group (CBG 1) before completing decoding of all the code blocks in the second code block group (CBG 2). A UE 115 may perform a cyclic redundancy check as part of decoding the code block groups. In some examples, the UE 115 may perform a cyclic redundancy check associated with the transport block in addition to performing cyclic redundancy checks associated with each code block group. In some examples, if the UE 115 is able to successfully decode all code block groups included in a transport block, and the cyclic redundancy check associated with the transport block fails, then the UE 115 is configured to send a non-acknowledgement (NACK) for the failed transport block. In this example, a base station 105 may receive the NACK, and may resend the code block groups (for example, code block groups that the UE 115 has decoded and delivered to the MAC layer) associated with the transport block (for example, the transport block associated with a failed cyclic redundancy check). In some aspects, receiving the code block groups associated with the transport block may result in an inconsistency at the UE 115. For example, the UE 115 may receive the code block groups after the data from the code block groups is delivered to the MAC layer. Thus, improved techniques for handling cyclic redundancy checks may be desired.

According to one or more aspects of the present disclosure, a UE 115 may bypass a cyclic redundancy check associated with the transport block based on determining that the transport block includes multiple code blocks. For example, a UE 115 may be configured to ignore a cyclic redundancy check associated with the transport block if the transport block includes multiple code blocks. In some aspects, a UE 115 may determine that a cyclic redundancy check value associated with the transport block is a fixed value and may bypass the cyclic redundancy check associated with the transport block based on the determination. For example, the base station 105 may replace the cyclic redundancy check value associated with the transport block to be a fixed value, and the base station 105 may then indicate the fixed value to the UE 115. In some aspects, the fixed value may be defined. In some examples, the fixed value (or a configuration to bypass the cyclic redundancy check) may be based on one or more cyclic redundancy check bits. For example, if the cyclic redundancy check bits are set to all 0s, then the UE 115 may be configured to bypass the cyclic redundancy check associated with the transport block.

In some examples, the UE 115 may determine an absence of a cyclic redundancy check value associated with the transport block based on determining that the transport block includes multiple code blocks. For example, the base station 105 may remove the cyclic redundancy check value associated with the transport block if the transport block includes multiple code blocks. Additionally or alternatively, the UE 115 may determine a cyclic redundancy check value associated with the each of the one or more code blocks in the code block group (such as CBG 1 and CBG 2). For example, the base station 105 may remove the cyclic redundancy check value associated with the transport block and may include cyclic redundancy check values associated with the each of the one or more code blocks if the transport block includes multiple code blocks. Additionally or alternatively, the UE 115 may determine a cyclic redundancy check value associated with a code block group, and the UE 115 may decode the code blocks in the code block group based on the determined cyclic redundancy check value.

Additionally or alternatively, if one or more sub-protocol data units are aligned with one or more code block groups, then the base station 105 may not re-transmit a delivered sub-protocol data unit (such as SubPDU 1) in case a second sub-protocol data unit is not delivered. In some examples, if a sub-protocol data unit (such as SubPDU 1) is aligned with code blocks instead of code block group, then re-transmission of the sub-protocol data unit may occur if other code blocks in the code block group is not successfully delivered. As such, an early delivery of sub-protocol data units (such as SubPDU 1) upon successful reception of the corresponding code block groups (such as CBG 1) or the code blocks (such as CB1, CB2, and CB3) may result in improved throughput and reduced latency.

According to one or more aspects of the present disclosure, the UE 115 may receive, from the base station 105, a configuration for transmitting a transport block. In some examples, the configuration may include an alignment of sub-protocol data units and a cyclic redundancy check configuration. In some aspects, the base station 105 may indicate to the UE 115 whether to align sub-protocol data units with a boundary associated with a code block group. Additionally or alternatively, the base station 105 may indicate whether and how to transmit a cyclic redundancy check associated with a transport block. In some examples, the base station 105 may indicate the configuration via RRC signaling or dynamic signaling (such as uplink grant in DCI). In some examples, the UE 115 may determine an alignment of a sub-protocol data unit of the MAC layer based on receiving the configuration, and transmit, to the base station 105 and based on the alignment, a transport block including one or more code blocks in a first code block group (such as CBG 1) and one or more code blocks in a second code block group (such as CBG 2). In some examples, the base station 105 may determine a mode for the UE 115 based on a configuration of the UE 115. In some examples, the mode may be used by the base station 105 for decoding code block groups and delivering the decoded data from a physical layer to a MAC layer.

Figure 5:
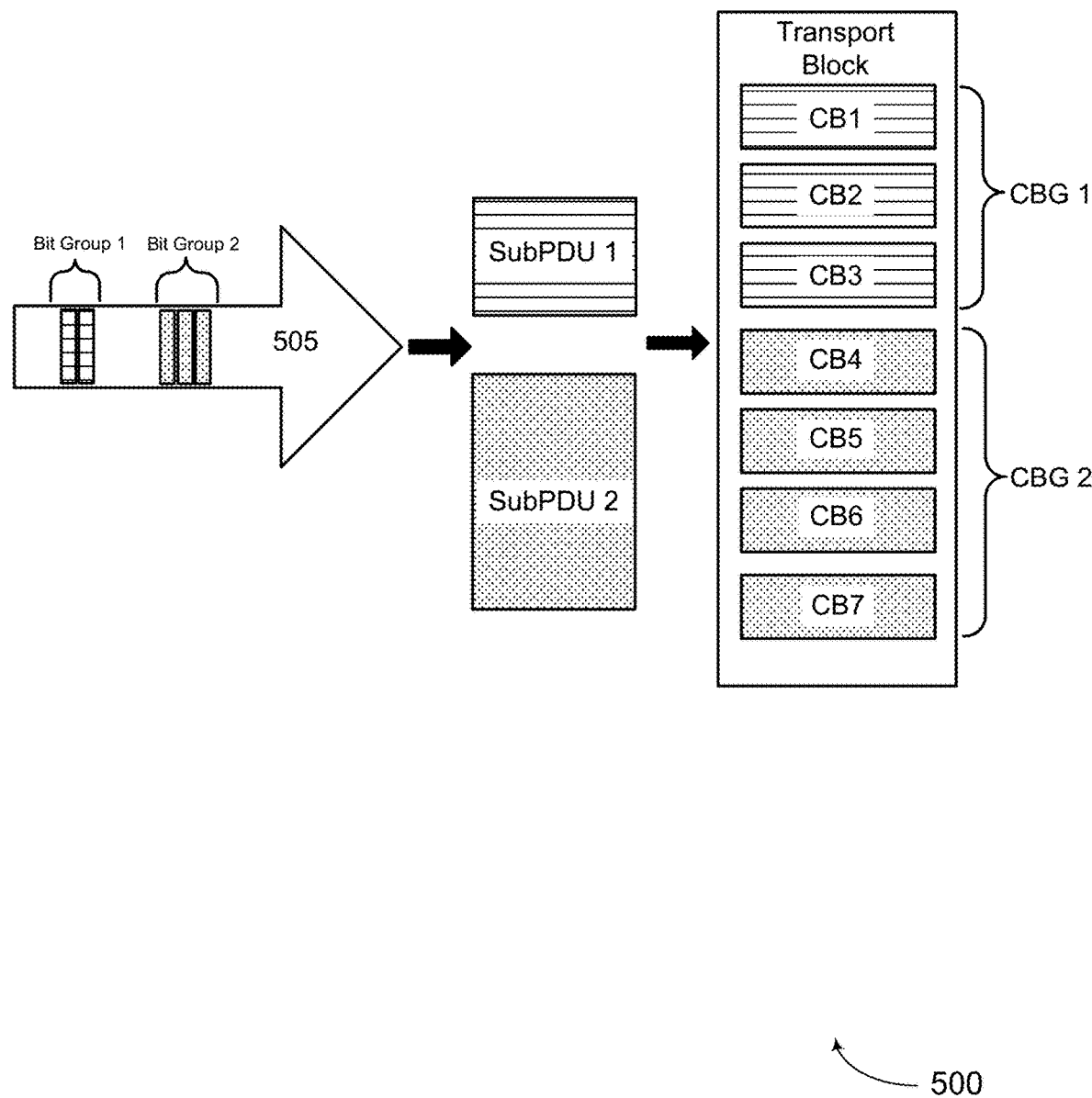
FIG. 5 illustrates an example of a mapping that supports data packet grouping for traffic awareness in NR in accordance with aspects of the present disclosure.

FIG. 5 illustrates an example of a mapping 500 that supports data packet grouping for traffic awareness in NR in accordance with aspects of the present disclosure. In some examples, the mapping 500 may implement aspects of the wireless communications system 100 and the wireless communications system 200 as described with reference to FIG. 1 and FIG. 2. In the example of FIG. 5, the mapping 500 may depict an alignment of one or more bit groups with sub-protocol data units of a MAC layer, and an alignment of the sub-protocol data units of a MAC layer with one or more code block groups in a transport block. In some examples, the mapping 500 may be implemented in an uplink transmission. Although not demonstrated in the example of FIG. 5, the mapping 500 may be implemented by a UE 115 (for example, a UE 115 as described with reference to FIG. 1). In some examples, the UE 115 may be configured to perform the methods performed by a base station 105 (for example, a base station 105 as described with reference to FIG. 1) with reference to FIG. 5.

According to one or more aspects of the present disclosure, a base station 105 may receive a data stream from an application. In some aspects, the data stream may be received in the form of bit groups (such as bit group 1 and bit group 2). In some aspects, the files described with reference to FIG. 2 and FIG. 3 may also be referred to as bit groups. For example, bit group 1 described with reference to FIG. 5 may represent a first file and bit group 2 described with reference to FIG. 5 may represent a second file.

According to the present disclosure, the base station 105 may map a first sub-protocol data unit (SubPDU 1) of the MAC layer to a first single group of bits (bit group 1) (for example, to be processed together) and second sub-protocol data unit (SubPDU 2) of the MAC layer to a second single group of bits (bit group 2) (for example, to be processed together). In some aspects, the base station 105 may then map one or more sub-protocol data units of the MAC layer to one or more code block groups. For example, the base station 105 may map a first sub-protocol data unit (SubPDU 1) of the MAC layer to a first code block group (CBG 1) and a second sub-protocol data unit (SubPDU 2) of the MAC layer to a second code block group (CBG 2). As depicted in the example of FIG. 5, CB1, CB2, and CB3 are grouped into the first code block group (CBG 1), and CB4, CB5, CB6, and CB7 are grouped into the second code block group (CBG 2). That is, the base station 105 may map the bit group 1 to the first sub-protocol data unit (SubPDU 1), and may map the first sub-protocol data unit (SubPDU 1) to the code blocks CB1, CB2, and CB3 of the first code block group (CBG 1). Additionally, the base station 105 may map the bit group 2 to the second sub-protocol data unit (SubPDU 2), and may map the second sub-protocol data unit (SubPDU 2) to the code blocks CB4, CB5, CB6, and CB7 of the second code block group (CBG 2). In some examples, the first bit group (bit group 1) and the second bit group (bit group 2) may be included in the same logical channel 505. In some examples, a base station 105 may drop a sub-protocol data unit (such as SubPDU 1) from re-transmission in a transport block if a bit-group delivery deadline is exceeded.

Figure 6:
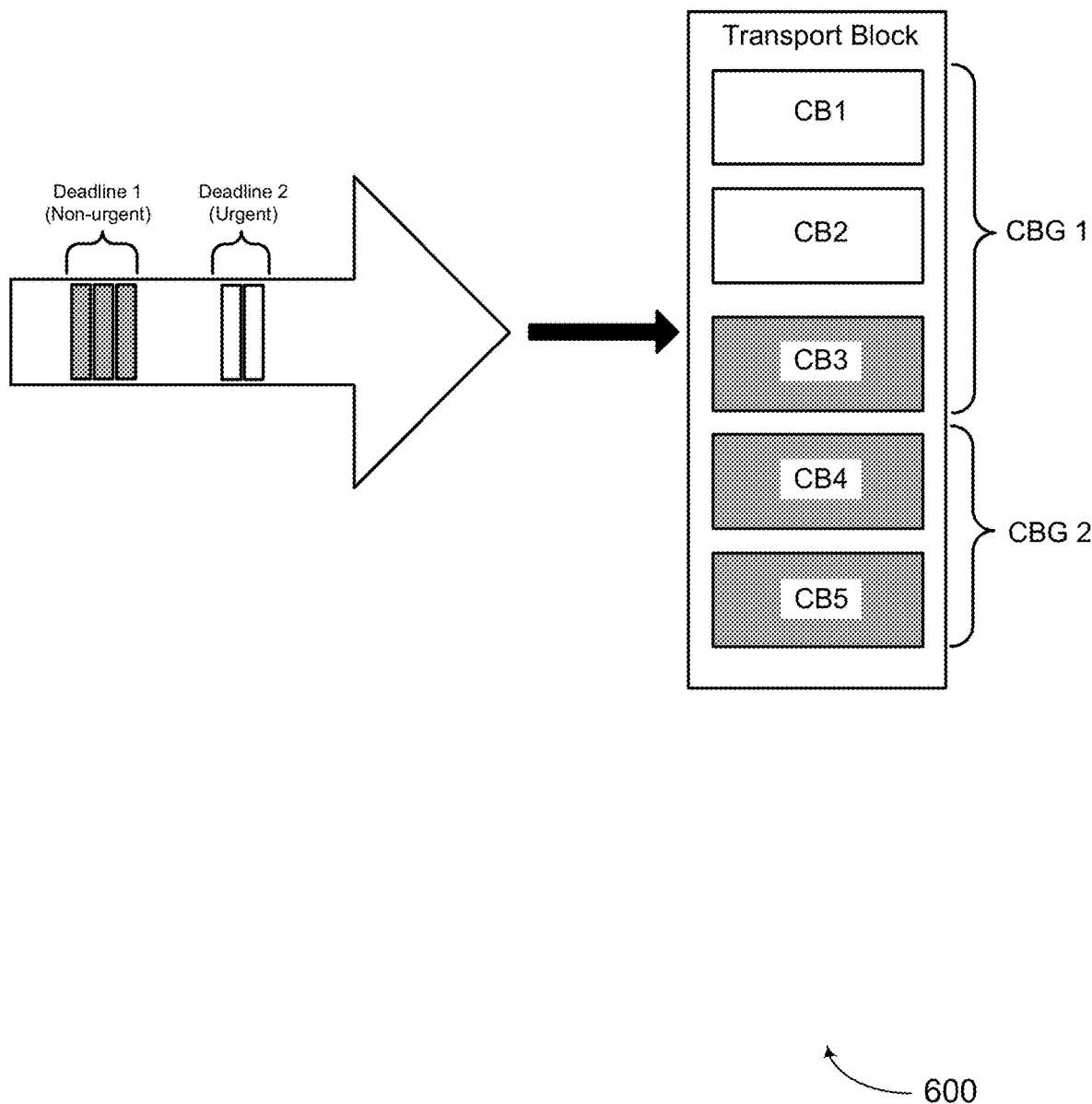
FIG. 6 illustrates an example of a mapping that supports data packet grouping for traffic awareness in NR in accordance with aspects of the present disclosure.

FIG. 6 illustrates an example of a mapping 600 that supports data packet grouping for traffic awareness in NR in accordance with aspects of the present disclosure. In some examples, the mapping 600 may implement aspects of wireless communications system 100 and the wireless communications system 200 as described with reference to FIG. 1 and FIG. 2. In the example of FIG. 6, the mapping 600 may depict a mapping of packets (such as data packets included in one or more sub-protocol data units) to one or more code block groups in a transport block based on delivery deadlines associated with the packets. In some examples, the mapping 600 may be implemented in an uplink transmission. Although not demonstrated in the example of FIG. 6, the mapping 600 may be implemented by a UE 115 (for example, a UE 115 as described with reference to FIG. 1). In some examples, the UE 115 may be configured to perform the methods performed by a base station 105 (for example, a base station 105 as described with reference to FIG. 1) with reference to FIG. 6.

According to one or more aspects of the present disclosure, a transmitter (such as a UE 115 or a base station 105) may map a first group of packets to a first code block (CB1) in the first code block group (CBG 1) and a second code block (CB2) in the first code block group (CBG 1). As depicted in the example of FIG. 6, the first group of packets may have an urgent deadline (Deadline 2). In some examples, a base station 105 may map a second group of packets to a third code block (CB3) in the first code block group (CBG1), a first code block (CB4) in the second code block group (CBG 2), and a second code block (CB5) in the second code block group (CBG 2). In some examples, the second group of packets may have a non-urgent deadline (Deadline 1). As described with reference to FIGS. 2-5, the base station 105 may map the packets as previously described, and the UE 115 may receive the mapped packets. The UE 115 may then deliver the first code block (CB1) in the first code block group (CBG 1), the second code block (CB2) in the first code block group (CBG 1), and the third code block (CB3) in the first code block group (CBG 1) to the MAC layer before decoding the second code block. In such an example, the data packets with a higher priority (such as an urgent deadline) may be delivered to the MAC layer at the UE 115 before a complete decoding of the transport block.

In some examples, the base station 105 may map the first group of packets to the first code block (CB1) in the first code block group (CBG 1) and the second code block (CB2) in the first code block group (CBG 1). Instead of mapping the second group of packets to the third code block (CB3) in the first code block group (CBG1), the base station 105 may add one or more padding bits in the third code block (CB3) in the first code block group (CBG1) and may map the second group of packets to the second code block group (CBG 2). That is, the base station 105 may align the second group of packets to be within the second code block group (CBG 2). In such an example, if one or more sub-protocol data units expire (for example, if a packet delivery deadline associated with the one or more sub-protocol data units has passed), then the base station 105 may exclude the code block group associated with the one or more sub-protocol data units for a code block group-based retransmission.

Figure 7:
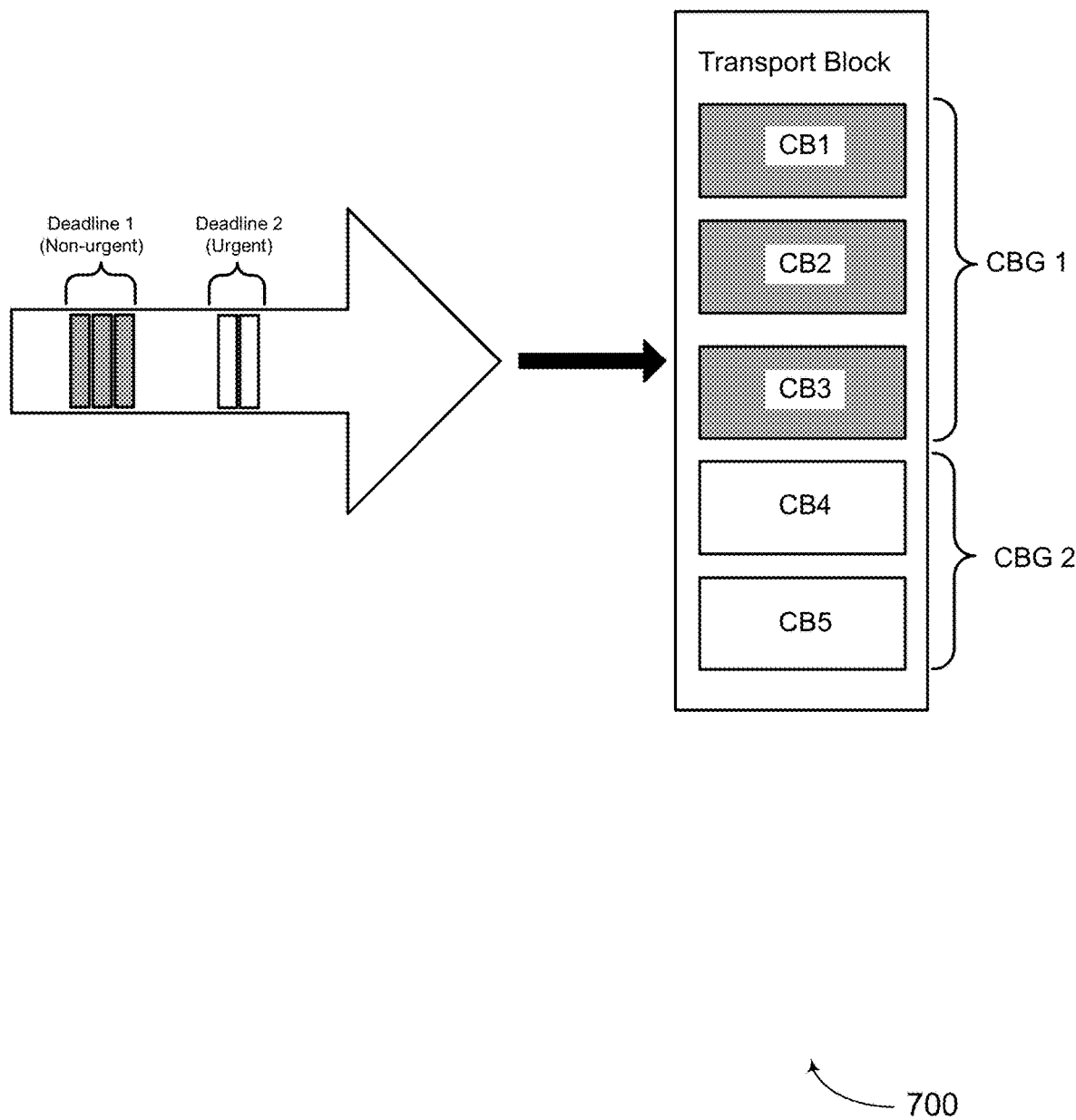
FIG. 7 illustrates an example of a mapping that supports data packet grouping for traffic awareness in NR in accordance with aspects of the present disclosure.

FIG. 7 illustrates an example of a mapping 700 that supports data packet grouping for traffic awareness in NR in accordance with aspects of the present disclosure. In some examples, the mapping 700 may implement aspects of wireless communications system 100 and the wireless communications system 200 as described with reference to FIG. 1 and FIG. 2. In the example of FIG. 7, the mapping 700 may depict a mapping of packets (such as data packets included in one or more sub-protocol data units) to one or more code block groups in a transport block based on delivery deadlines associated with the packets. In some examples, the mapping 700 may be implemented in an uplink transmission. In some examples, a UE 115 (for example, a UE 115 as described with reference to FIG. 1) may be configured to perform the methods performed by a base station 105 (for example, a base station 105 as described with reference to FIG. 1) with reference to FIG. 7.

According to one or more aspects of the present disclosure, a base station 105 may map a first group of packets to a first code block (CB1) in the first code block group (CBG 1), a second code block (CB2) in the first code block group (CBG 1), and a third code block (CB3) in the first code block group (CBG1). As depicted in the example of FIG. 7, the first group of packets may have a non-urgent deadline (Deadline 1). In some examples, the base station 105 may map a second group of packets to a first code block (CB4) in the second code block group (CBG 2), and a second code block (035) in the second code block group (CBG 2). In some examples, the second group of packets may have an urgent deadline (Deadline 2). As described with reference to FIGS. 2-6, the base station 105 may map the packets as previously described, and the UE 115 may receive the packets. In such an example, the mapping 700 may avoid staggering of a group of packets across multiple code block groups (such as CBG 1 and CBG 2). According to one or more aspects of the present disclosure, one benefit of such a mapping technique (such as, the mapping 700) is that the decoding of an urgent group of packets may depend on the decoding of the code blocks containing urgent data (for example, packets having an urgent deadline). In the example of FIG. 7, the decoding of the urgent group of packets may depend on the decoding of CB4 and CB5. Another benefit of this mapping technique is that the UE 115 may deliver data from any decoded code block group to the MAC layer, without waiting for the decoding of the prior code block groups. In the example of FIG. 7, a starting boundary of each code block group is aligned with a starting of a header of a sub-protocol data unit. The MAC layer of the UE 115 may utilize the alignment of the starting boundary of each code block group to interpret data (such as, decoded data) from a code block group without receiving data from prior code block groups. For example, the MAC layer of the UE 115 may receive the urgent group of packets as soon as CBG 2 (in the example of FIG. 7) is decoded without waiting for the remaining code block groups in the transport block.

Figure 8:
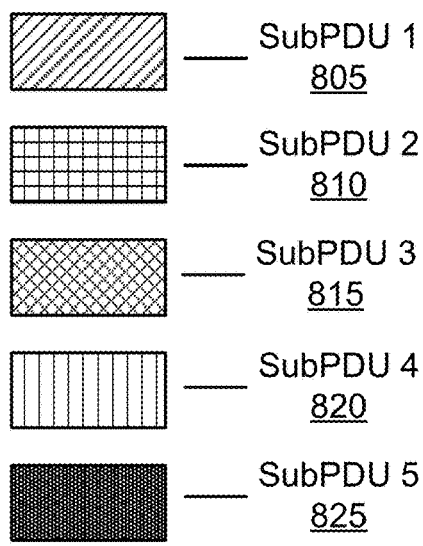
FIG. 8 illustrates an example of alignments that supports data packet grouping for traffic awareness in NR in accordance with aspects of the present disclosure.
Figure 8:
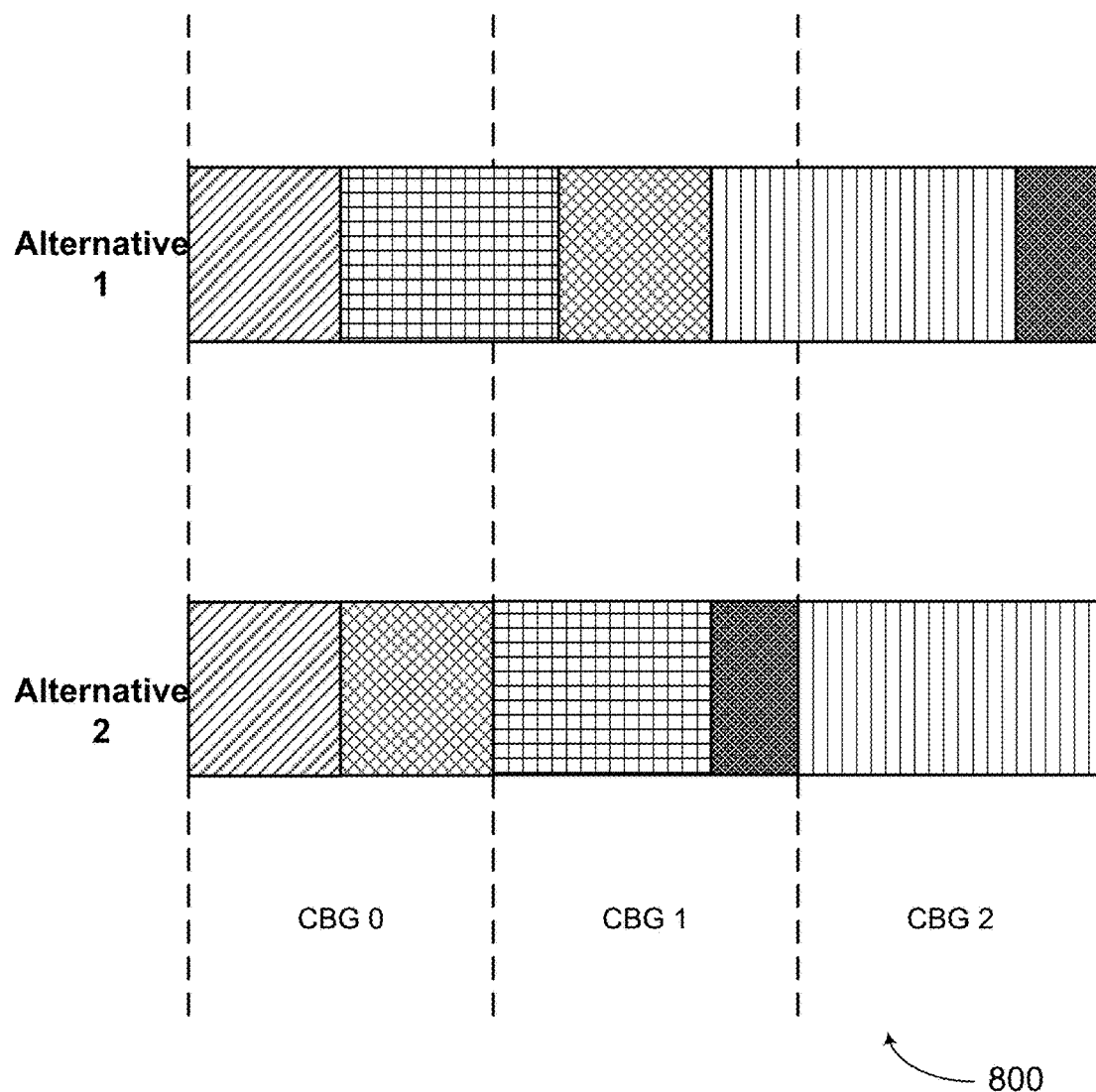

FIG. 8 illustrates an example of alignments 800 that supports data packet grouping for traffic awareness in NR in accordance with aspects of the present disclosure. In some examples, the alignments 800 may implement aspects of wireless communications system 100. In some examples, the alignments 800 may be implemented in an uplink transmission. In the example of FIG. 8, the alignments 800 may include alignments of multiple sub-protocol data units (SubPDU 1 805, SubPDU 2 810, SubPDU 3 815, SubPDU 4 820, and SubPDU 5 825) according to a first alternative (Alternative 1) and according to a second alternative (Alternative 2). Specifically, the first alternative (Alternative 1) describes an example in which a base station 105 (for example, a base station 105 as described with reference to FIG. 1) maps the sub-protocol data units as received in a data stream (for example, without regards to boundaries of the sub-protocol data units). As depicted in the example of FIG. 8, the base station 105 may map the first sub-protocol data unit (SubPDU 1 805) to a first code block group (CBG 0). Additionally, the base station may 105 map the second sub-protocol data unit (SubPDU 2 810) to both the first code block group (CBG 0) and the second code block group (CBG 1), may map the third sub-protocol data unit (SubPDU 3 815) to the second code block group (CBG 1), may map the fourth sub-protocol data unit (SubPDU 4 820) to both the second code block group (CBG 1) and may map the third code block group (CBG 2), and the fifth sub-protocol data unit (SubPDU 5 825) to the third code block group (CBG 2).

In the example of FIG. 8, the second alternative (Alternative 2) describes an example in which the base station 105 maps the sub-protocol data units to be aligned with a boundary of the code block groups. In the second alternative (Alternative 2), the base station 105 may align a boundary of the first sub-protocol data unit (SubPDU 1 805) with a starting boundary of the first code block group (CBG 0). Additionally, the base station may align the third sub-protocol data unit (SubPDU 3 815) to be within the first code block group (CBG 0). As further depicted in the example of FIG. 8, the base station 105 may align a boundary of the second sub-protocol data unit (SubPDU 2 810) with a starting boundary of the second code block group (CBG 1). In some aspects, the base station 105 may align the fifth sub-protocol data unit (SubPDU 5 825) to be within the second code block group (CBG 1). Additionally, the base station 105 align a boundary of the fourth sub-protocol data unit (SubPDU 4 820) with a starting boundary of the third code block group (CBG 2). In some examples, aligning the sub-protocol data units of the MAC layer within a code block group may provide benefits over mapping the sub-protocol data units as received in a logical channel. That is, a mapping method described in the second alternative (Alternative 2) may provide benefits over the mapping method described in the first alternative (Alternative 1). In some aspects, a receiver (such as a UE 115 as described with reference to FIG. 1) may be able to receive a higher number of sub-protocol data units using the mapping method described in the second alternative (Alternative 2) as depicted in Table 3.

TABLE 3

| Code Block Group Decoding Outcome CBG 0 | Code Block Group Decoding Outcome CBG 1 | Code Block Group Decoding Outcome CBG 2 | Number of SubPDUs delivered to MAC Alternative 1 | Number of SubPDUs delivered to MAC Alternative 2 |
| --- | --- | --- | --- | --- |
| Unsuccessful | Unsuccessful | Unsuccessful | 0 | 0 |
| Successful | Unsuccessful | Unsuccessful | 1 | 2 |
| Unsuccessful | Successful | Unsuccessful | 1 | 2 |
| Unsuccessful | Unsuccessful | Successful | 1 | 1 |
| Unsuccessful | Successful | Successful | 3 | 3 |
| Successful | Unsuccessful | Successful | 2 | 3 |
| Successful | Successful | Unsuccessful | 3 | 4 |
| Successful | Successful | Successful | 5 | 5 |

Figure 9:
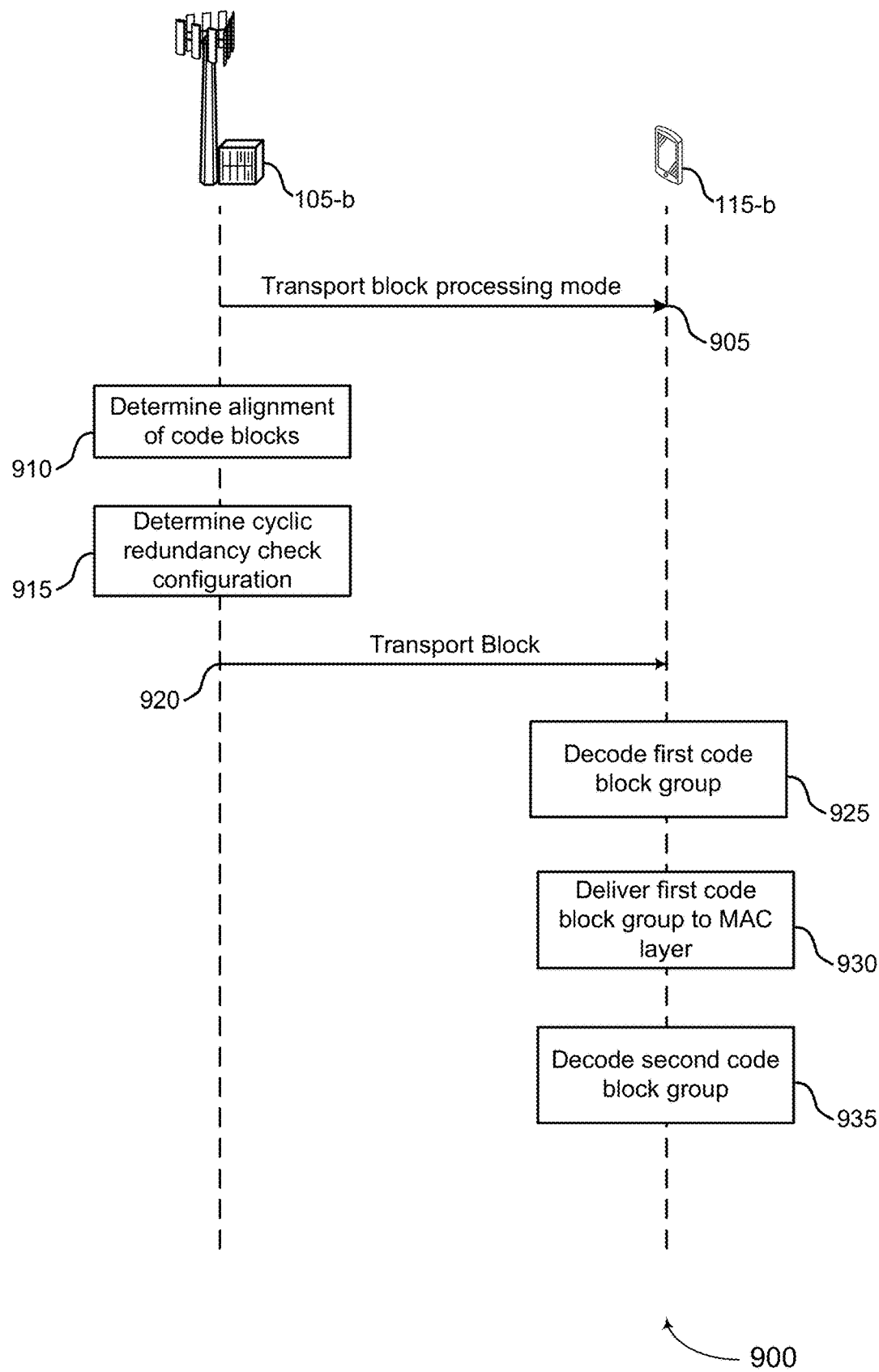
FIG. 9 illustrates an example of a process flow that supports data packet grouping for traffic awareness in NR in accordance with aspects of the present disclosure.

FIG. 9 illustrates an example of a process flow 900 that supports data packet grouping for traffic awareness in NR in accordance with aspects of the present disclosure. In some examples, the process flow 900 may implement aspects of wireless communications systems 100 and 200, as described with reference to FIGS. 1 and 2. The process flow 900 may include a base station 105-*b* and a UE 115-*b*, which may be examples of the corresponding devices described with reference to FIGS. 1 and 2.

In the following description of the process flow 900, the operations performed by the base station 105-*b* and the UE 115-*b* may be performed in a different order or at different times than in the example shown. Some operations may also be omitted from the process flow 900, and other operations may be added to the process flow 900.

At 905, the base station 105-*b* may transmit an indication of a mode for processing a transport block. In some examples, the mode may be associated with a rule set for delivering decoded code blocks to a MAC layer of the UE 115-*b*. For example, the rule set may indicate a first mode, or a second mode, or a third mode to the UE 115-*b*. In some aspects, the first mode may configure the UE 115-*b* to deliver one or more decoded bits to the MAC layer after decoding all code blocks in a transport block. In some other aspects, the second mode may configure the UE 115-*b* to deliver the decoded bits of a decoded code block (or a code block group) to the MAC layer, if all prior code blocks (or a code block group) in the transport block have been decoded. In yet other aspects, the third mode may configure the UE 115-*b* to deliver the decoded bits of any decoded code block (or a code block group) to the MAC layer.

At 910, the base station 105-*b* may determine an alignment of a sub-protocol data unit of the MAC layer based on transmitting the indication of mode. For example, the base station 105-*b* may align the sub-protocol data unit of the MAC layer within the first code block group. In some examples, the base station 105-*b* may align the sub-protocol data unit of the MAC layer with a boundary of the first code block group.

At 915, the base station 105-*b* may determine a cyclic redundancy check configuration. In some examples, the cyclic redundancy check configuration may be based on the mode for processing the transport block. In some aspects, the base station 105-*b* may determine whether to send a cyclic redundancy check value associated with the transport block based on the mode for processing the transport block. In some aspects, the base station 105-*b* may determine that a cyclic redundancy check value associated with the transport block is a fixed value. Alternatively, the base station 105-*b* may remove the cyclic redundancy check value associated with the transport block. In some aspects, the base station 105-*b* may replace the cyclic redundancy check value associated with the transport block with cyclic redundancy check values associated with one or more code block groups included in the transport block. In some aspects, the base station 105-b may replace the cyclic redundancy check value associated with the transport block with cyclic redundancy check values associated with the each of the one or more code blocks in a code block group included in the transport block.

In some examples, the UE 115-b may be configured to utilize the first mode (as described at 905) if the cyclic redundancy check configuration (as described at 915) does not allow the UE 115-b to bypass the cyclic redundancy check associated with the transport block. For example, the UE 115-b may deliver one or more decoded bits to the MAC layer after decoding all code blocks in a transport block if the UE 115-b is not allowed to bypass the cyclic redundancy check associated with the transport block. In some examples, the UE 115-b may be configured to utilize the second mode (as described at 905) if the cyclic redundancy check configuration (as described at 915) configures the UE 115-b to bypass the cyclic redundancy check associated with the transport block. In some examples, the UE 115-b may be configured to utilize the third mode (as described at 905) if the cyclic redundancy check configuration (as described at 915) configures the UE 115-b to bypass the cyclic redundancy check associated with the transport block and if a starting boundary of each code block group is aligned with a starting boundary of a sub-protocol data unit.

At 920, the UE 115-b may receive, from the base station 105-b, a transport block including one or more code blocks in a first code block group and one or more code blocks in a second code block group and may decode the one or more code blocks in the first code block group of the transport block to decode one or more bits of the one or more code blocks in the first code block group, at 925.

At 930, the UE 115-b may deliver, to the MAC layer of the UE and based on the mode for processing the transport block, the one or more decoded bits of the one or more decoded code blocks in the first code block group before completing the decoding of the second code block group. At 935, the UE 115-b may decode the one or more code blocks in the second code block group of the transport block to decode one or more bits of the one or more code blocks in the second code block group.

The operations performed by the base station 105-b and the UE 115-b as part of, but not limited to, process flow 900 may provide improvements to communication links in wireless communications systems. Further, the operations performed by the base station 105-b and the UE 115-b as part of, but not limited to, process flow 900 may provide benefits and enhancements to the operation of the UE 115-b while performing communications having a high throughput and low latency. For example, the described methods in the process flow 900 may support enhanced throughput in XR applications, among other advantages.

Figure 10:
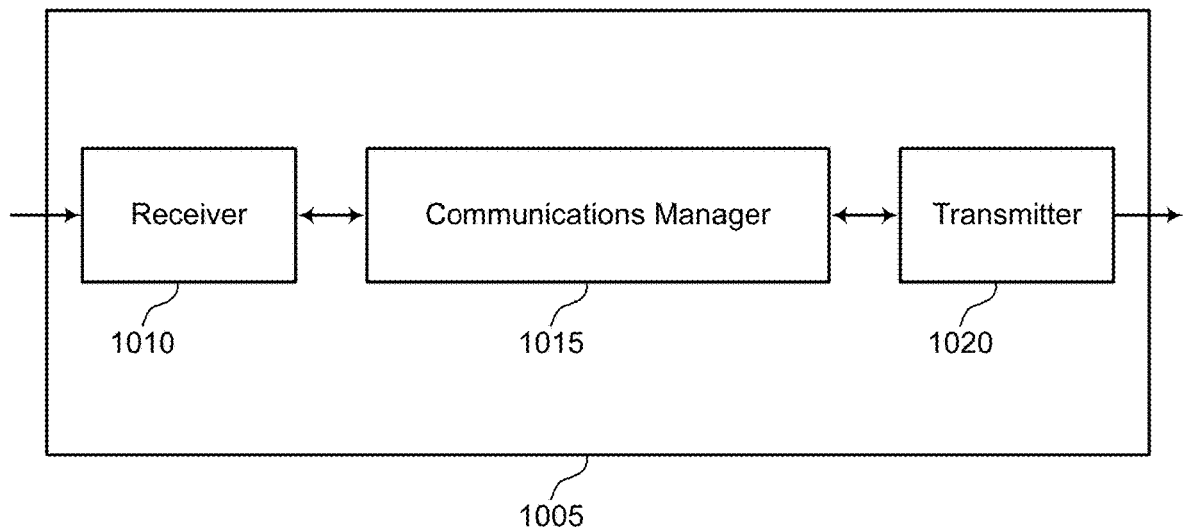
FIGS. 10 and 11 show block diagrams of devices that support data packet grouping for traffic awareness in NR in accordance with aspects of the present disclosure.

FIG. 10 shows a block diagram of a device 1005 that supports data packet grouping for traffic awareness in NR in accordance with aspects of the present disclosure. The device 1005 may be an example of aspects of a UE 115. The device 1005 may include a receiver 1010, a communications manager 1015, and a transmitter 1020. The communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to data packet grouping for traffic awareness in NR). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a base station, an indication of a mode for processing a transport block. In some examples, the mode is associated with a rule set for delivering decoded code blocks to a MAC layer of the UE. The communications manager 1015 may receive, from the base station, the transport block including one or more code blocks in a first code block group and one or more code blocks in a second code block group, decode the one or more code blocks in the first code block group of the transport block to decode one or more bits of the one or more code blocks in the first code block group, and deliver, to the MAC layer of the UE and based on the mode for processing the transport block, the one or more decoded bits of the one or more decoded code blocks in the first code block group before completing the decoding of the second code block group.

The communications manager 1015 may receive, from a base station, a configuration for transmitting a transport block, in which the configuration includes an alignment of sub-protocol data units and a cyclic redundancy check configuration, determine an alignment of a sub-protocol data unit of the MAC layer based on receiving the configuration, and transmit, to the base station and based on the alignment, a transport block including one or more code blocks in a first code block group and one or more code blocks in a second code block group.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

The actions performed by the communications manager 1015 as described may be implemented to realize one or more potential advantages. For example, in some aspects, the communications manager 1015 may decrease communication latency and enhance channel throughput for XR applications. The improvements in the communication link supporting XR applications (for example, decreasing communication latency and increasing reliability) may further save power and increase battery life at a UE 115 (for example, by reducing complexity and retransmissions).

Figure 11:
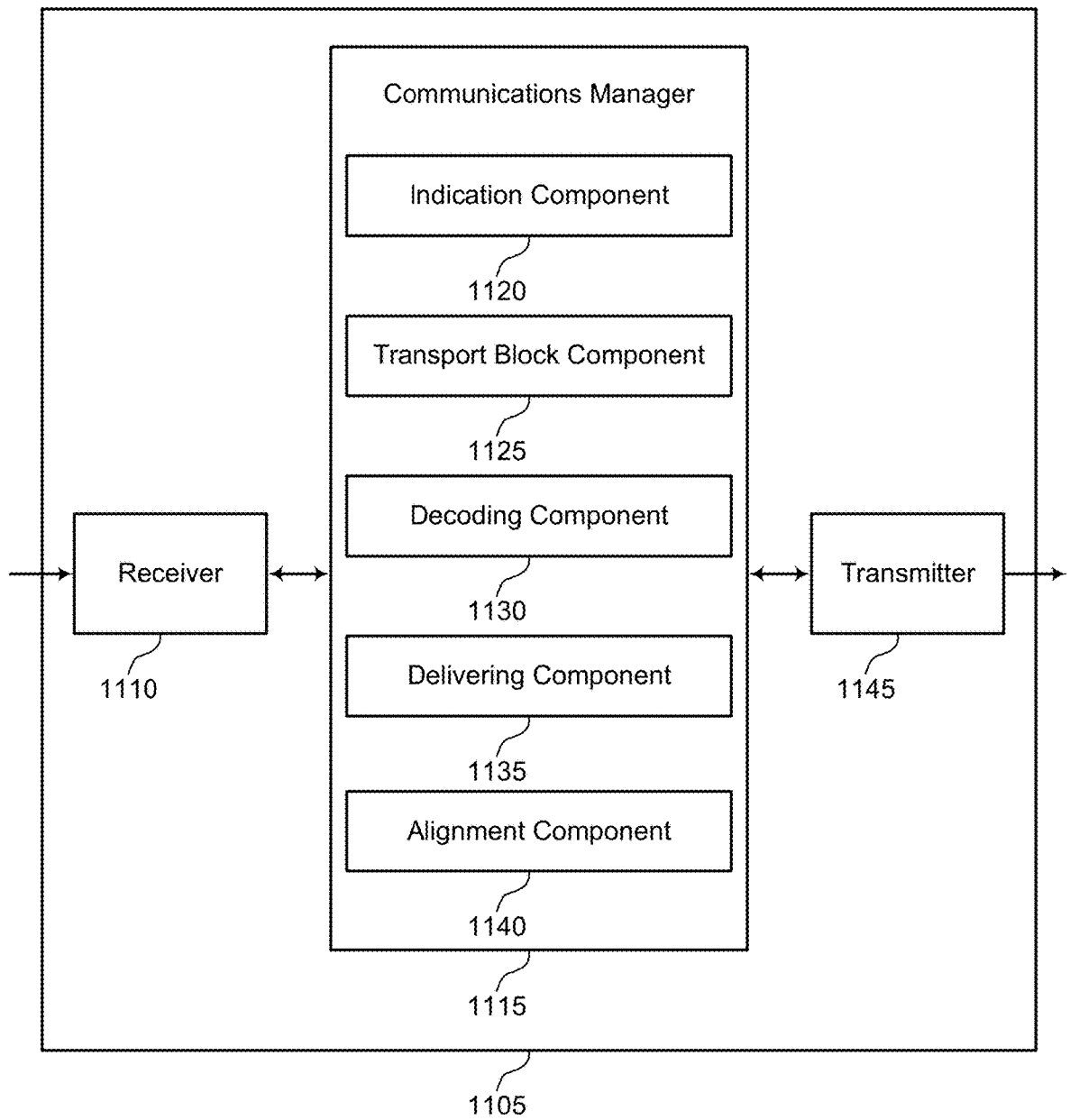

FIG. 11 shows a block diagram of a device 1105 that supports data packet grouping for traffic awareness in NR in accordance with aspects of the present disclosure. The device 1105 may be an example of aspects of a device 1005, or a UE 115. The device 1105 may include a receiver 1110, a communications manager 1115, and a transmitter 1145. The communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to data packet grouping for traffic awareness in NR). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015. The communications manager 1115 may include an indication component 1120, a transport block component 1125, a decoding component 1130, a delivering component 1135, and an alignment component 1140. The communications manager 1115 may be an example of aspects of the communications manager 1310 described herein.

The indication component 1120 may receive, from a base station, an indication of a mode for processing a transport block, in which the mode is associated with a rule set for delivering decoded code blocks to a MAC layer of the UE. The indication component 1120 may receive, from the base station, a configuration for transmitting a transport block, in which the configuration includes an alignment of sub-protocol data units and a cyclic redundancy check configuration. The transport block component 1125 may receive, from the base station, the transport block including one or more code blocks in a first code block group and one or more code blocks in a second code block group. The decoding component 1130 may decode the one or more code blocks in the first code block group of the transport block to decode one or more bits of the one or more code blocks in the first code block group. The delivering component 1135 may deliver, to the MAC layer of the UE and based on the mode for processing the transport block, the one or more decoded bits of the one or more decoded code blocks in the first code block group before completing the decoding of the second code block group. The alignment component 1140 may determine an alignment of a sub-protocol data unit of the MAC layer based on receiving the configuration. The transport block component 1125 may transmit, to the base station and based on the alignment, a transport block including one or more code blocks in a first code block group and one or more code blocks in a second code block group.

The transmitter 1145 may transmit signals generated by other components of the device 1105. In some examples, the transmitter 1145 may be collocated with a receiver 1110 in a transceiver component. For example, the transmitter 1145 may be an example of aspects of the transceiver 1320 described with reference to FIG. 13. The transmitter 1145 may utilize a single antenna or a set of antennas.

Figure 12:
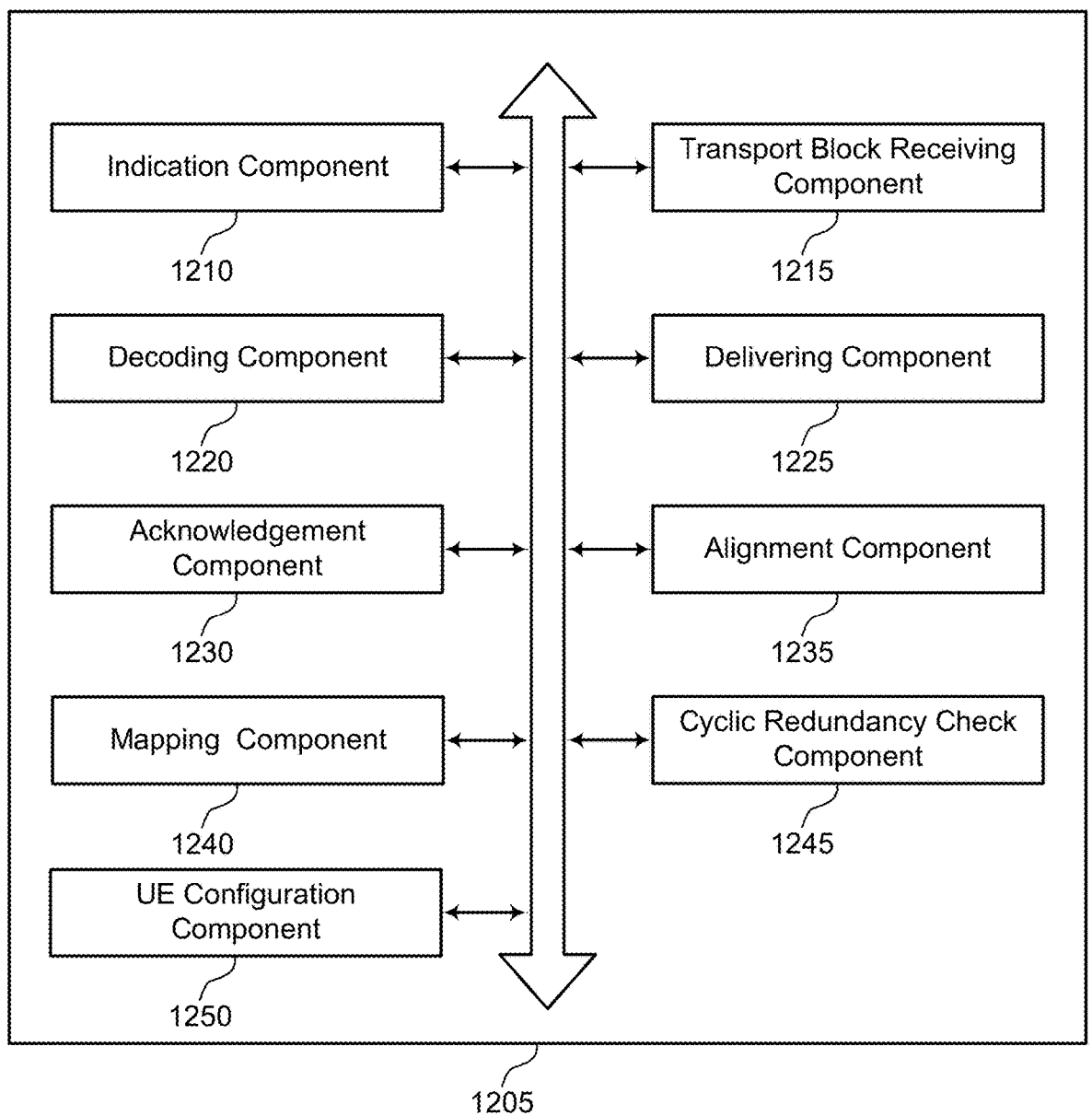
FIG. 12 shows a block diagram of a communications manager that supports data packet grouping for traffic awareness in NR in accordance with aspects of the present disclosure.

FIG. 12 shows a block diagram of a communications manager 1205 that supports data packet grouping for traffic awareness in NR in accordance with aspects of the present disclosure. The communications manager 1205 may be an example of aspects of a communications manager 1015, a communications manager 1115, or a communications manager 1310 described herein. The communications manager 1205 may include an indication component 1210, a transport block component 1215, a decoding component 1220, a delivering component 1225, an acknowledgement component 1230, an alignment component 1235, a mapping component 1240, a cyclic redundancy check component 1245, and a UE configuration component 1250. Each of these components may communicate, directly or indirectly, with one another (for example, via one or more buses).

The indication component 1210 may receive, from a base station, an indication of a mode for processing a transport block, in which the mode is associated with a rule set for delivering decoded code blocks to a MAC layer of the UE. In some aspects, the indication of the mode includes an RRC signal. In some aspects, the indication of the mode includes a DCI signal. The indication component 1210 may receive, from the base station, a configuration for transmitting a transport block, in which the configuration includes an alignment of sub-protocol data units and a cyclic redundancy check configuration. In some examples, the configuration for transmitting the transport block indicates whether to align the sub-protocol data unit of the MAC within the first code block group. In some examples, the configuration for transmitting the transport block includes an RRC signal. In some examples, the configuration for transmitting the transport block includes a DCI signal.

The transport block component 1215 may receive, from the base station, the transport block including one or more code blocks in a first code block group and one or more code blocks in a second code block group. The decoding component 1220 may decode the one or more code blocks in the first code block group of the transport block to decode one or more bits of the one or more code blocks in the first code block group. The delivering component 1225 may deliver, to the MAC layer of the UE and based on the mode for processing the transport block, the one or more decoded bits of the one or more decoded code blocks in the first code block group before completing the decoding of the second code block group.

The alignment component 1235 may determine an alignment of a sub-protocol data unit of the MAC layer based on receiving the configuration. The transport block component 1215 may transmit, to the base station and based on the alignment, a transport block including one or more code blocks in a first code block group and one or more code blocks in a second code block group.

The acknowledgement component 1230 may transmit an acknowledgement of the decoding of the one or more code blocks in the first code block group being successful. In some examples, delivering the one or more decoded bits of the one or more decoded code blocks in the first code block group is based on transmitting the acknowledgement. The alignment component 1235 may determine that a sub-protocol data unit of the MAC layer is aligned within the first code block group. In some examples, delivering the one or more decoded bits of the one or more decoded code blocks in the first code block group is based on the determining.

In some examples, the alignment component 1235 may determine that a sub-protocol data unit of the MAC layer is aligned with a boundary of the first code block group. In some examples, delivering the one or more decoded bits of the one or more decoded code blocks in the first code block group is based on the determining. In some examples, the alignment component 1235 may determine that a single sub-protocol data unit of the MAC layer is included within the first code block group. In some examples, delivering the one or more decoded bits of the one or more decoded code blocks in the first code block group is based on the determining. In some examples, the alignment component 1235 may determine that a sub-protocol data unit of the MAC layer is aligned within a code block. In some examples, delivering the one or more decoded bits of the one or more decoded code blocks in the first code block group is based on the determining.

In some examples, the alignment component 1235 may align the sub-protocol data unit of the MAC layer within the first code block group, in which transmitting the transport block is based on aligning the sub-protocol data unit. In some examples, the alignment component 1235 may align the sub-protocol data unit of the MAC layer with a boundary of the first code block group, in which transmitting the transport block is based on aligning the sub-protocol data unit.

In some examples, the alignment component 1235 may determine that a single sub-protocol data unit of the MAC layer is included within the first code block group, in which transmitting the transport block is based on aligning the sub-protocol data unit. In some examples, the alignment component 1235 may align the sub-protocol data unit of the MAC layer within a code block, in which transmitting the transport block is based on aligning the sub-protocol data unit.

The mapping component 1240 may determine that a first group of packets has a first priority and a second group of packets has a second priority lower than the first priority, map, based on one or more of the first priority and the second priority, the first group of packets to the first code block group, and map, based on one or more of the first priority and the second priority, the second group of packets to the first code block group and the second code block group, in which transmitting the transport block includes transmitting the first group of packets and the second group of packets.

In some examples, the mapping component 1240 may map a first group of packets to the first code block group, in which the first group of packets is aligned within the first code block group, and map a second group of packets to the second code block group, in which the second group of packets is aligned within the second code block group. In some aspects, transmitting the transport block includes transmitting the first group of packets and the second group of packets. In some examples, the second group of packets has a first priority and the first group of packets has a second priority lower than the first priority.

In some examples, the mapping component 1240 may map a first group of packets to the first code block group, in which the first group of packets is aligned within the first code block group, add one or more padding bits in the first code block group, and map a second group of packets to the second code block group, in which transmitting the transport block includes transmitting the first group of packets, the padding bits, and the second group of packets. In some aspects, the first group of packets is aligned within the first code block group based on adding the one or more padding bits.

In some aspects, a first sub-protocol data unit of the MAC layer includes a first single group of bits and a second sub-protocol data unit of the MAC layer includes a second single group of bits. In some aspects, a first sub-protocol data unit of the MAC layer and a second sub-protocol data unit of the MAC layer are included in a single logical channel.

In some examples, transport block component 1215 may determine that the transport block includes a set of code blocks. The cyclic redundancy check component 1245 may bypass a cyclic redundancy check associated with the transport block based on determining that the transport block includes the set of code blocks. In some examples, the cyclic redundancy check component 1245 may determine that a cyclic redundancy check value associated with the transport block is a fixed value. In some examples, the cyclic redundancy check component 1245 may bypass a cyclic redundancy check associated with the transport block based on determining that the cyclic redundancy check value associated with the transport block is the fixed value.

In some examples, transport block component 1215 may determine that the transport block includes a set of code blocks. In some examples, the cyclic redundancy check component 1245 may determine an absence of a cyclic redundancy check value associated with the transport block based on determining that the transport block includes the set of code blocks. In some examples, the cyclic redundancy check component 1245 may bypass a cyclic redundancy check associated with the transport block based on determining the absence of the cyclic redundancy check value associated with the transport block.

In some examples, transport block component 1215 may determine that the transport block includes the one or more code blocks in the first code block group. In some examples, the cyclic redundancy check component 1245 may determine a cyclic redundancy check value associated with the each of the one or more code blocks in the first code block group. In some examples, decoding the one or more code blocks in the first code block group is based on determining the cyclic redundancy check values. In some examples, the cyclic redundancy check component 1245 may determine a cyclic redundancy check value associated with the first code block group. In some examples, decoding the one or more code blocks in the first code block group is based on determining the cyclic redundancy check value. In some examples, the cyclic redundancy check component 1245 may bypass a cyclic redundancy check associated with the transport block based on determining the cyclic redundancy check value associated with the first code block group, in which delivering the one or more decoded bits of the one or more decoded code blocks in the first code block group is based on bypassing the cyclic redundancy check. In some examples, the cyclic redundancy check component 1245 may determine that a second cyclic redundancy check value associated with the transport block is a fixed value. In some examples, delivering the one or more decoded bits of the one or more decoded code blocks in the first code block group is based on the determining. In some examples, the cyclic redundancy check component 1245 may determine an absence of the second cyclic redundancy check value associated with the transport block based on determining the cyclic redundancy check value associated with the first code block group. In some examples, delivering the one or more decoded bits of the one or more decoded code blocks in the first code block group is based on determining the absence of the second cyclic redundancy check value.

In some examples, the delivering component 1225 may deliver the one or more decoded code blocks in the first code block group is independent of determining a cyclic redundancy check value associated with the transport block.

In some examples, the indication component 1210 may receive, from the base station, a second indication of a second mode for processing the transport block. In some examples, the delivering component 1225 may deliver, to the MAC layer of the UE and based on the second mode for processing the transport block, one or more decoded bits of a first code block before completing the decoding of a second code block.

In some examples, the decoding component 1220 may decode the one or more code blocks in the second code block group to decode one of more bits of the one or more code blocks in the second code block group. In some examples, the delivering component 1225 may deliver, to the MAC layer of the UE and based on the mode for processing the transport block, the one or more decoded code blocks in the second code block group, in which delivering the one or more decoded bits of the one or more decoded code blocks in the second code block group occurs after delivering the one or more decoded bits of the one or more decoded code blocks in the first code block group, and the one or more decoded code blocks in the first code block group and the one or more decoded code blocks in the second code block group includes an entirety of the transport block.

In some examples, the cyclic redundancy check component 1245 may determine the cyclic redundancy check configuration based on receiving the configuration for transmitting the transport block. In some examples, the cyclic redundancy check component 1245 may determine that a cyclic redundancy check value associated with the transport block is a fixed value, in which transmitting the transport block is based on the determining.

In some aspects, the cyclic redundancy check component 1245 may determine that the transport block includes a set of code blocks, and refrain from indicating a cyclic redundancy check value associated with the transport block based on determining that the transport block includes the set of code blocks.

In some examples, UE configuration component 1250 may transmit, to the base station, a configuration of the UE for delivering one or more transport blocks to a MAC layer at the UE, in which receiving the configuration for transmitting the transport block is based on the configuration of the UE.

Figure 13:
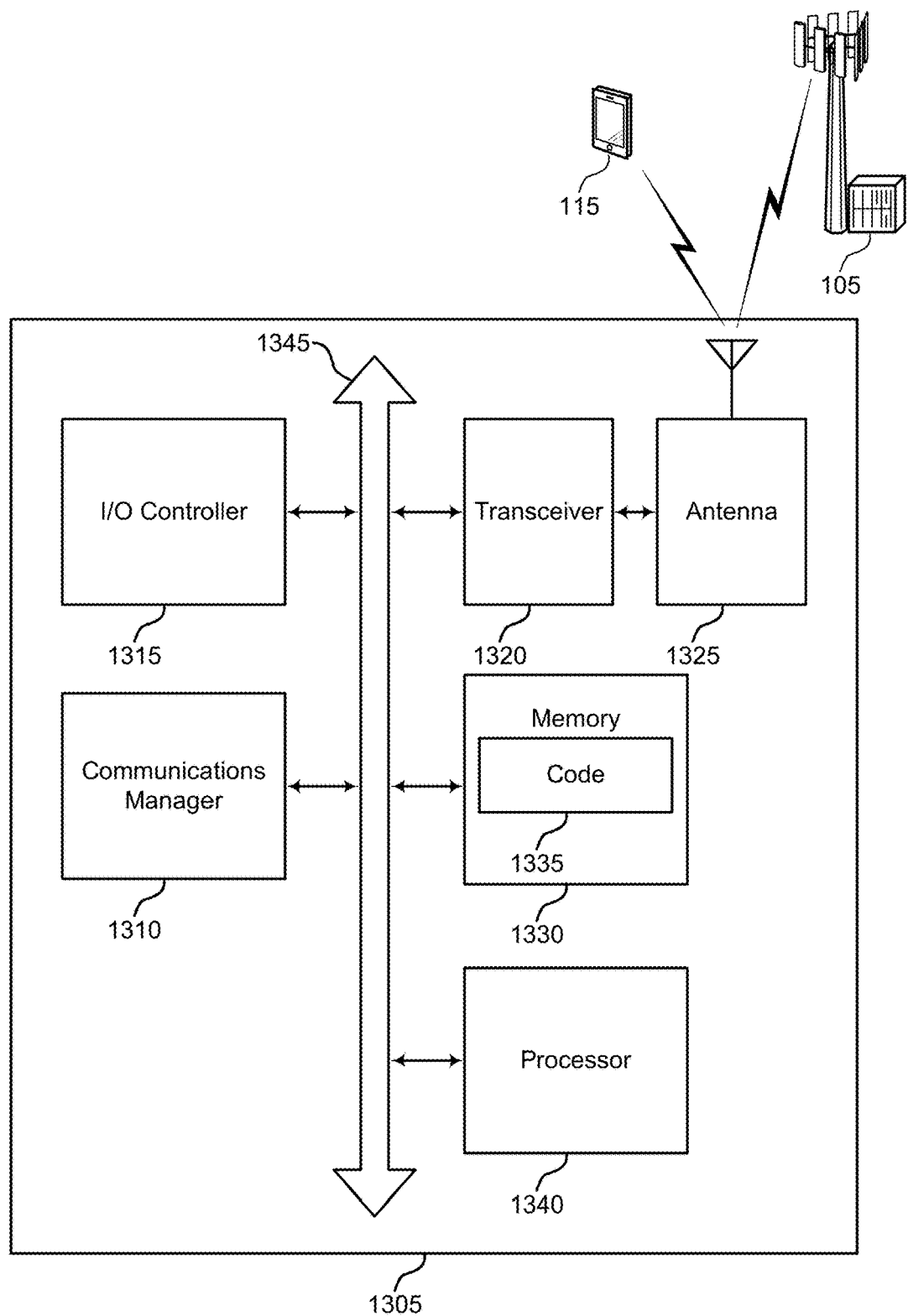
FIG. 13 shows a diagram of a system including a device that supports data packet grouping for traffic awareness in NR in accordance with aspects of the present disclosure.

FIG. 13 shows a diagram of a system including a device 1305 that supports data packet grouping for traffic awareness in NR in accordance with aspects of the present disclosure. The device 1305 may be an example of or include the components of device 1005, device 1105, or a UE 115. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (for example, bus 1345).

The communications manager 1310 may receive, from a base station, an indication of a mode for processing a transport block, in which the mode is associated with a rule set for delivering decoded code blocks to a MAC layer of the UE, receive, from the base station, the transport block including one or more code blocks in a first code block group and one or more code blocks in a second code block group, decode the one or more code blocks in the first code block group of the transport block to decode one or more bits of the one or more code blocks in the first code block group, and deliver, to the MAC layer of the UE and based on the mode for processing the transport block, the one or more decoded bits of the one or more decoded code blocks in the first code block group before completing the decoding of the second code block group.

The I/O controller 1315 may manage input and output signals for the device 1305. The I/O controller 1315 may also manage peripherals not integrated into the device 1305. In some aspects, the I/O controller 1315 may represent a physical connection or port to an external peripheral. In some aspects, the I/O controller 1315 may utilize an operating system such as iOS®, ANDROID®, MS-DOS®, MS-WINDOWS®, OS/2®, UNIX®, LINUX®, or another known operating system. In other implementations, the I/O controller 1315 may represent or interact with a modem, a keyboard, a mouse, a touchscreen, or a similar device. In some examples, the I/O controller 1315 may be implemented as part of a processor. In some examples, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some aspects, the wireless device may include a single antenna 1325. However, in some aspects the device may have more than one antenna 1325, which may be capable of concurrently transmitting or receiving multiple wireless transmissions. The memory 1330 may include random-access memory (RAM) and read-only memory (ROM). The memory 1330 may store computer-readable, computer-executable code 1335 including instructions that, if executed, cause the processor to perform various functions described herein. In some aspects, the memory 1330 may contain, among other things, a basic I/O system (BIOS) which may control basic hardware or software operation such as the interaction with peripheral components or devices.

The processor 1340 may include an intelligent hardware device, (for example, a general-purpose processor, a digital signal processor (DSP), a CPU, a microcontroller, an ASIC, an FPGA, a programmable logic device, a discrete gate or transistor logic component, a discrete hardware component, or any combination thereof). In some aspects, the processor 1340 may be configured to operate a memory array using a memory controller. In other implementations, a memory controller may be integrated into the processor 1340. The processor 1340 may be configured to execute computer-readable instructions stored in a memory (for example, the memory 1330) to cause the device 1305 to perform various functions (for example, functions or tasks supporting data packet grouping for traffic awareness in NR).

The code 1335 may include instructions to implement aspects of the present disclosure, including instructions to support wireless communications. The code 1335 may be stored in a non-transitory computer-readable medium such as system memory or other type of memory. In some aspects, the code 1335 may not be directly executable by the processor 1340 but may cause a computer (for example, if compiled and executed) to perform functions described herein.

Figure 14:
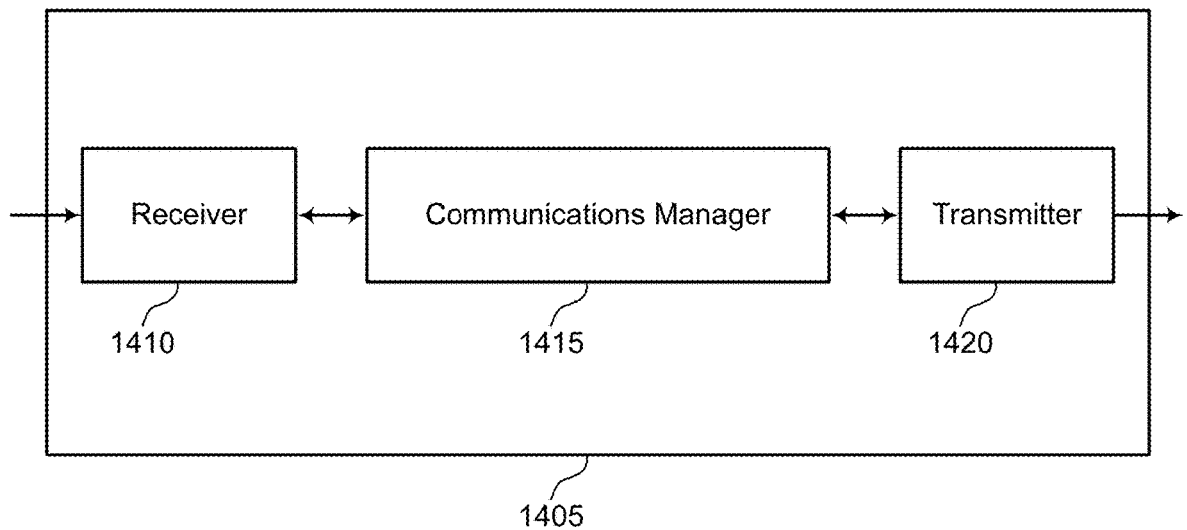
FIGS. 14 and 15 show block diagrams of devices that support data packet grouping for traffic awareness in NR in accordance with aspects of the present disclosure.

FIG. 14 shows a block diagram of a device 1405 that supports data packet grouping for traffic awareness in NR in accordance with aspects of the present disclosure. The device 1405 may be an example of aspects of a base station 105. The device 1405 may include a receiver 1410, a communications manager 1415, and a transmitter 1420. The communications manager 1415 can be implemented, at least in part, by one or both of a modem and a processor. Each of these components may be in communication with one another (for example, via one or more buses).

The receiver 1410 may receive information such as packets, user data, or control information associated with various information channels (for example, control channels, data channels, and information related to data packet grouping for traffic awareness in NR). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may transmit, to a UE, an indication of a mode for processing a transport block, in which the mode is associated with a rule set for delivering decoded code blocks to a MAC layer of the UE, determine an alignment of a sub-protocol data unit of the MAC layer based on transmitting the indication, and transmit, to the UE and based on the alignment, a transport block including one or more code blocks in a first code block group and one or more code blocks in a second code block group The transmitter 1420 may transmit signals generated by other components of the device 1405. In some examples, the transmitter 1420 may be collocated with a receiver 1410 in a transceiver component. For example, the transmitter 1420 may be an example of aspects of the transceiver 1720 described with reference to FIG. 17. The transmitter 1420 may utilize a single antenna or a set of antennas.

Figure 15:
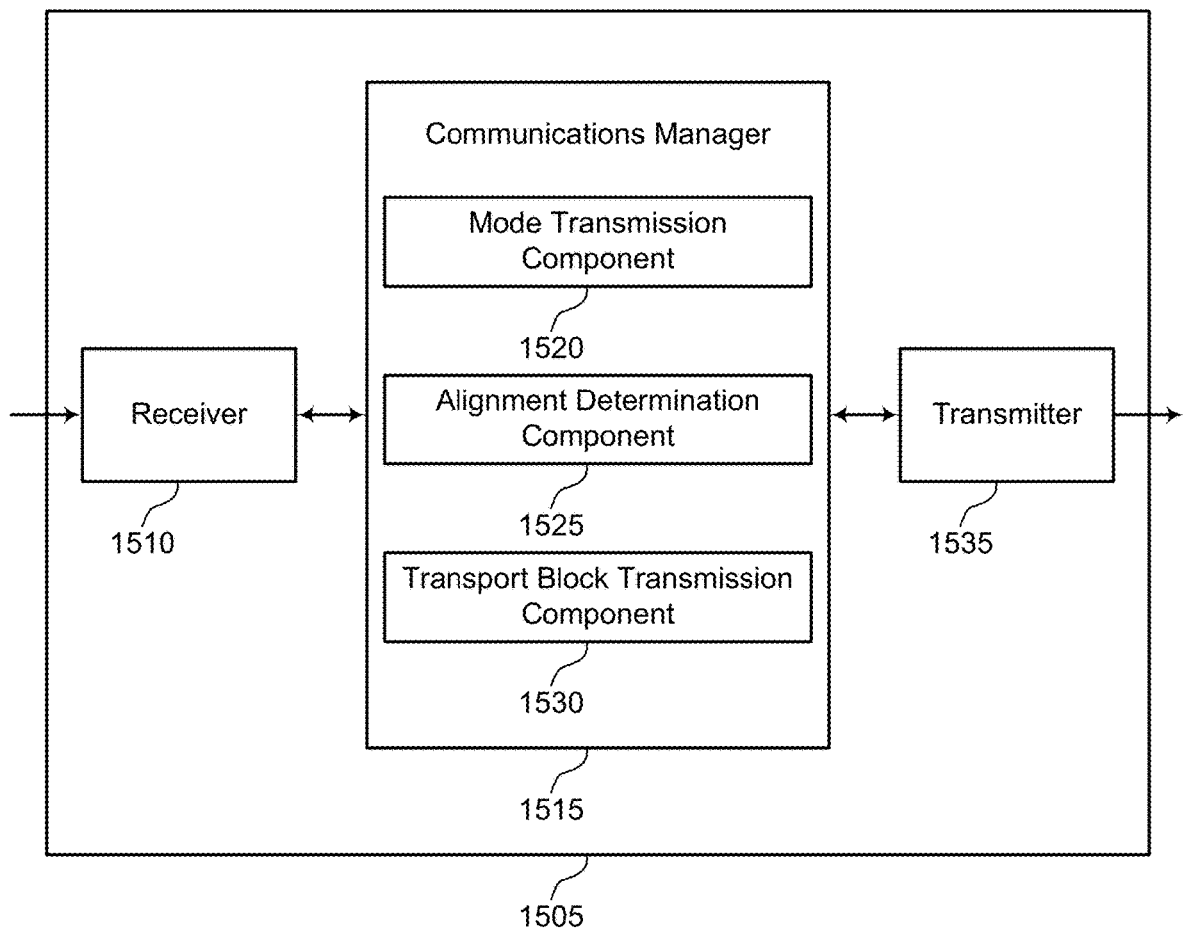

FIG. 15 shows a block diagram of a device 1505 that supports data packet grouping for traffic awareness in NR in accordance with aspects of the present disclosure. The device 1505 may be an example of aspects of a device 1405, or a base station 105. The device 1505 may include a receiver 1510, a communications manager 1515, and a transmitter 1535. The communications manager 1515 can be implemented, at least in part, by one or both of a modem and a processor. Each of these components may be in communication with one another (for example, via one or more buses).

The receiver 1510 may receive information such as packets, user data, or control information associated with various information channels (for example, control channels, data channels, and information related to data packet grouping for traffic awareness in NR). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415. The communications manager 1515 may include a mode transmission component 1520, an alignment determination component 1525, and a transport block transmission component 1530. The communications manager 1515 may be an example of aspects of the communications manager 1710 described herein.

The mode transmission component 1520 may transmit, to a UE, an indication of a mode for processing a transport block, in which the mode is associated with a rule set for delivering decoded code blocks to a MAC layer of the UE. The alignment determination component 1525 may determine an alignment of a sub-protocol data unit of the MAC layer based on transmitting the indication. The transport block transmission component 1530 may transmit, to the UE and based on the alignment, a transport block including one or more code blocks in a first code block group and one or more code blocks in a second code block group.

The transmitter 1535 may transmit signals generated by other components of the device 1505. In some examples, the transmitter 1535 may be collocated with a receiver 1510 in a transceiver component. For example, the transmitter 1535 may be an example of aspects of the transceiver 1720 described with reference to FIG. 17. The transmitter 1535 may utilize a single antenna or a set of antennas.

Figure 16:
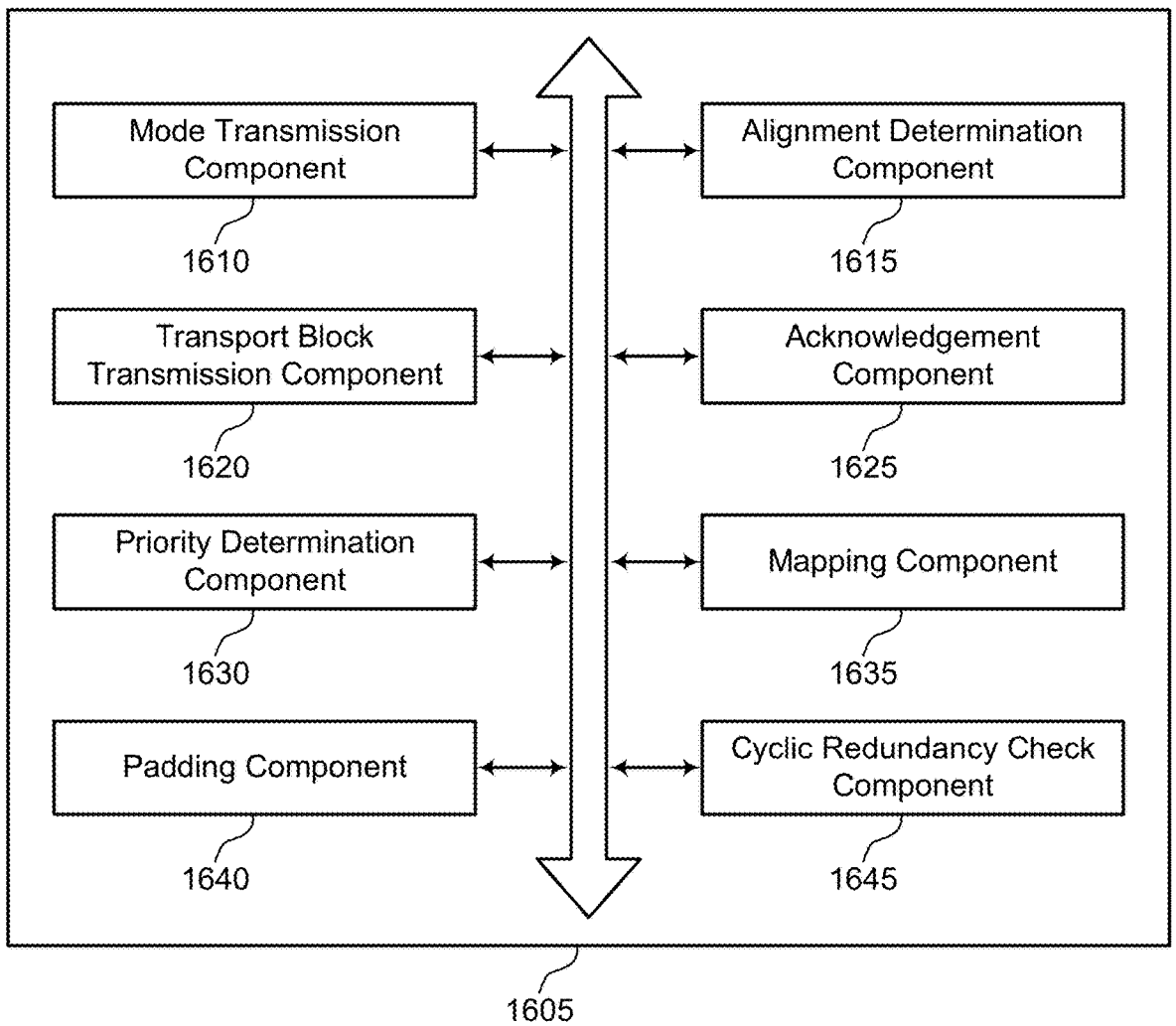
FIG. 16 shows a block diagram of a communications manager that supports data packet grouping for traffic awareness in NR in accordance with aspects of the present disclosure.

FIG. 16 shows a block diagram of a communications manager 1605 that supports data packet grouping for traffic awareness in NR in accordance with aspects of the present disclosure. The communications manager 1605 may be an example of aspects of a communications manager 1415, a communications manager 1515, or a communications manager 1710 described herein. The communications manager 1605 may include a mode transmission component 1610, an alignment determination component 1615, a transport block transmission component 1620, an acknowledgement component 1625, a priority determination component 1630, a mapping component 1635, a padding component 1640, and a cyclic redundancy check component 1645. Each of these components may communicate, directly or indirectly, with one another (for example, via one or more buses).

The mode transmission component 1610 may transmit, to a UE, an indication of a mode for processing a transport block, in which the mode is associated with a rule set for delivering decoded code blocks to a MAC layer of the UE. In some aspects, the indication of the mode includes an RRC signal. In some aspects, the indication of the mode includes a DCI signal. The alignment determination component 1615 may determine an alignment of a sub-protocol data unit of the MAC layer based on transmitting the indication. The transport block transmission component 1620 may transmit, to the UE and based on the alignment, a transport block including one or more code blocks in a first code block group and one or more code blocks in a second code block group.

The acknowledgement component 1625 may receive an acknowledgement of the decoding of the one or more code blocks in the first code block group being successful, in which transmitting the transport block is based on receiving the acknowledgement. In some examples, alignment determination component 1615 may align the sub-protocol data unit of the MAC layer within the first code block group. In some examples, transmitting the transport block is based on aligning the sub-protocol data unit.

In some examples, alignment determination component 1615 may align the sub-protocol data unit of the MAC layer with a boundary of the first code block group. In some examples, transmitting the transport block is based on aligning the sub-protocol data unit. In some examples, alignment determination component 1615 may determine that a single sub-protocol data unit of the MAC layer is included within the first code block group. In some examples, transmitting the transport block is based on aligning the sub-protocol data unit.

In some examples, the alignment determination component 1615 may align the sub-protocol data unit of the MAC layer within a code block, in which transmitting the transport block is based on aligning the sub-protocol data unit. In some examples, a first sub-protocol data unit of the MAC layer and a second sub-protocol data unit of the MAC layer are included in a single logical channel.

The priority determination component 1630 may determine that a first group of packets has a first priority and a second group of packets has a second priority lower than the first priority. The mapping component 1635 may map, based on one or more of the first priority and the second priority, the first group of packets to the first code block group. In some examples, the mapping component 1635 may map, based on one or more of the first priority and the second priority, the second group of packets to the first code block group and the second code block group, in which transmitting the transport block includes transmitting the first group of packets and the second group of packets.

In some examples, the mapping component 1635 may map a first group of packets to the first code block group, in which the first group of packets is aligned within the first code block group. In some examples, the mapping component 1635 may map a second group of packets to the second code block group, in which the second group of packets is aligned within the second code block group, and in which transmitting the transport block includes transmitting the first group of packets and the second group of packets. In some examples, the second group of packets has a first priority and the first group of packets has a second priority lower than the first priority.

In some examples, the mapping component 1635 may map a first group of packets to the first code block group. The padding component 1640 may add one or more padding bits in the first code block group. In some examples, the mapping component 1635 may map a second group of packets to the second code block group, in which transmitting the transport block includes transmitting the first group of packets, the padding bits, and the second group of packets.

In some examples, the mapping component 1635 may map a first single group of bits to a first sub-protocol data unit of the MAC layer. In some examples, the mapping component 1635 may map a second single group of bits to a second sub-protocol data unit of the MAC layer. In some examples, transmitting the transport block is based on mapping the first single group of bits and the second single group of bits.

The cyclic redundancy check component 1645 may determine that a cyclic redundancy check value associated with the transport block is a fixed value, in which transmitting the transport block is based on the determining.

In some examples, the alignment determination component 1615 may determine that the transport block includes a set of code blocks. In some examples, the cyclic redundancy check component 1645 may refrain from indicating a cyclic redundancy check value associated with the transport block based on determining that the transport block includes the set of code blocks.

In some examples, the alignment determination component 1615 may determine that the transport block includes the one or more code blocks in the first code block group. In some examples, the cyclic redundancy check component 1645 may determine a cyclic redundancy check value associated with the each of the one or more code blocks in the first code block group. In some examples, transmitting the transport block is based on determining the cyclic redundancy check values. In some examples, the cyclic redundancy check component 1645 may determine a cyclic redundancy check value associated with the first code block group. In some examples, transmitting the transport block is based on determining the cyclic redundancy check value.

Figure 17:
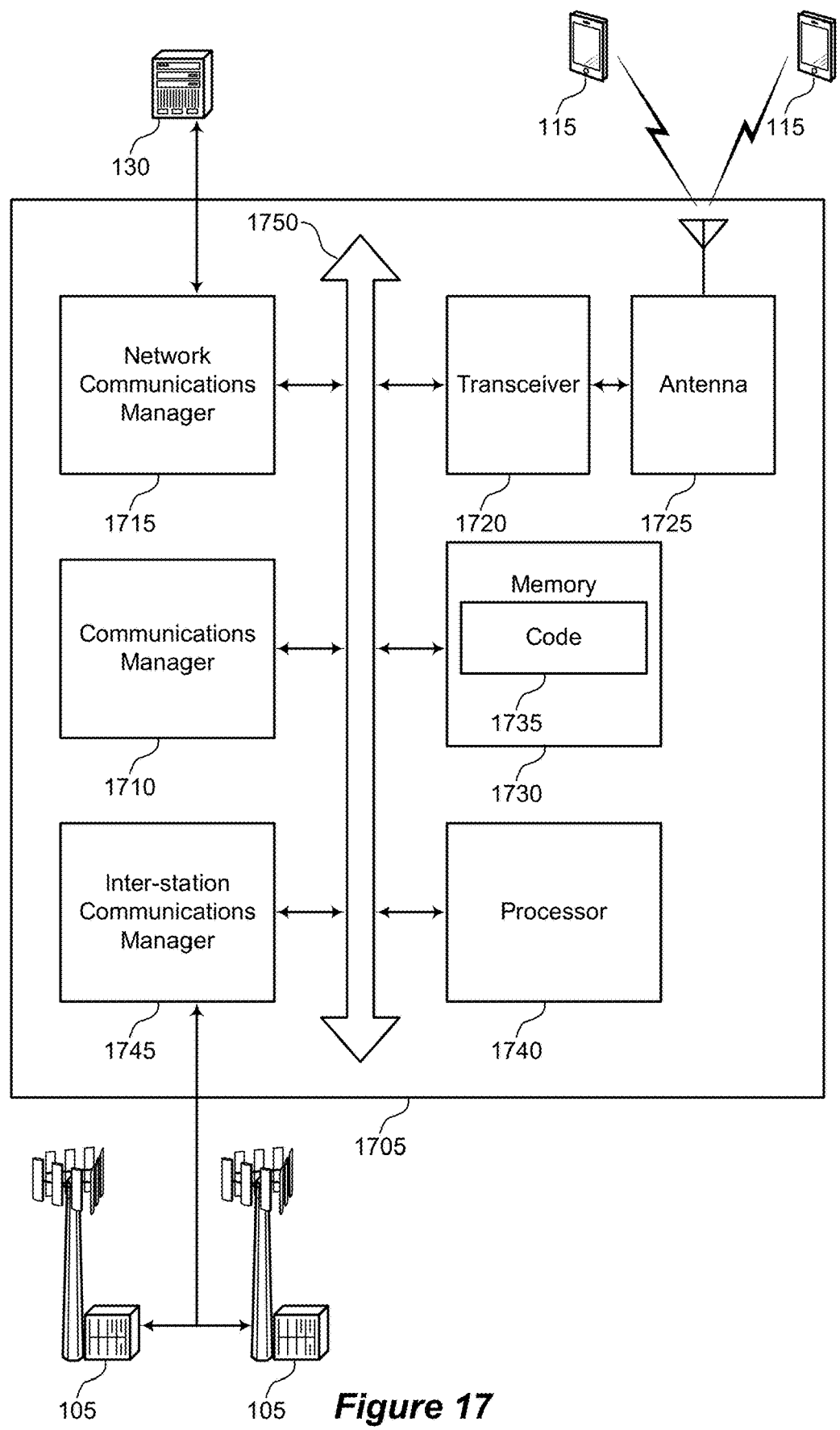
FIG. 17 shows a diagram of a system including a device that supports data packet grouping for traffic awareness in NR in accordance with aspects of the present disclosure.

FIG. 17 shows a diagram of a system including a device 1705 that supports data packet grouping for traffic awareness in NR in accordance with aspects of the present disclosure. The device 1705 may be an example of or include the components of device 1405, device 1505, or a base station 105. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (for example, bus 1750).

The communications manager 1710 may transmit, to a UE, an indication of a mode for processing a transport block, in which the mode is associated with a rule set for delivering decoded code blocks to a MAC layer of the UE, determine an alignment of a sub-protocol data unit of the MAC layer based on transmitting the indication, and transmit, to the UE and based on the alignment, a transport block including one or more code blocks in a first code block group and one or more code blocks in a second code block group.

The network communications manager 1715 may manage communications with the core network (for example, via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some aspects, the wireless device may include a single antenna 1725. However, in some aspects the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, if executed by a processor (for example, the processor 1740) cause the device to perform various functions described herein. In some aspects, the memory 1730 may contain, among other things, a BIOS which may control basic hardware or software operation such as the interaction with peripheral components or devices.

The processor 1740 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some aspects, the processor 1740 may be configured to operate a memory array using a memory controller. In some aspects, a memory controller may be integrated into processor 1740. The processor 1740 may be configured to execute computer-readable instructions stored in a memory (for example, the memory 1730) to cause the device 1705 to perform various functions (for example, functions or tasks supporting data packet grouping for traffic awareness in NR).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some aspects, the code 1735 may not be directly executable by the processor 1740 but may cause a computer (for example, if compiled and executed) to perform functions described herein.

Figure 18:
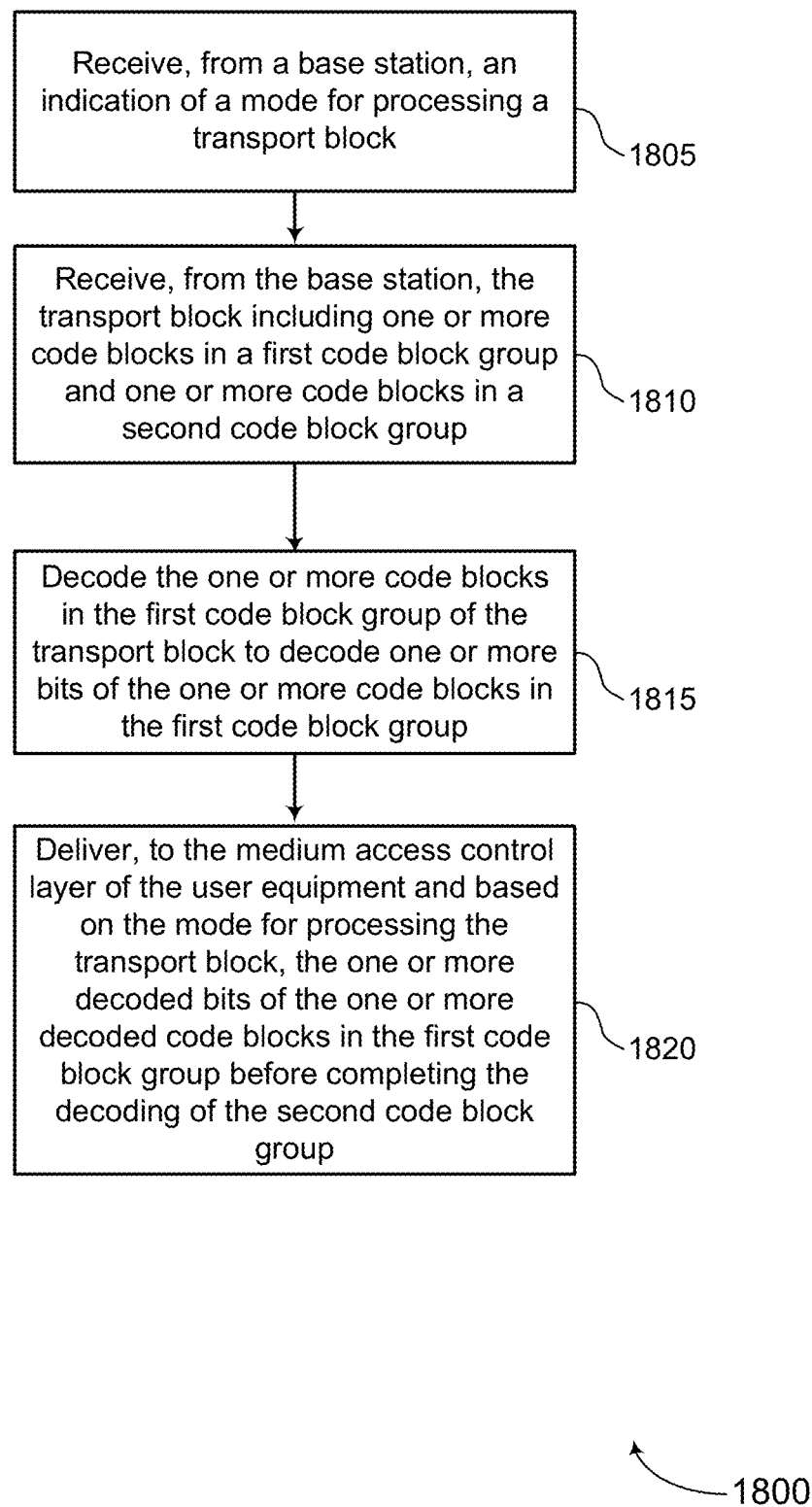
FIGS. 18-21 show flowcharts illustrating methods that support data packet grouping for traffic awareness in NR in accordance with aspects of the present disclosure.

FIG. 18 shows a flowchart illustrating a method 1800 that supports data packet grouping for traffic awareness in NR in accordance with aspects of the present disclosure. The operations of method 1800 may be implemented by a UE 115 or its components. For example, the operations of method 1800 may be performed by a communications manager as described with reference to FIGS. 10-13. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, an indication of a mode for processing a transport block, in which the mode is associated with a rule set for delivering decoded code blocks to a MAC layer of the UE. The operations of 1805 may be performed according to the methods described herein. In some examples, aspects of the operations of 1805 may be performed by an indication component as described with reference to FIGS. 10-13.

At 1810, the UE may receive, from the base station, the transport block including one or more code blocks in a first code block group and one or more code blocks in a second code block group. The operations of 1810 may be performed according to the methods described herein. In some examples, aspects of the operations of 1810 may be performed by a transport block component as described with reference to FIGS. 10-13.

At 1815, the UE may decode the one or more code blocks in the first code block group of the transport block to decode one or more bits of the one or more code blocks in the first code block group. The operations of 1815 may be performed according to the methods described herein. In some examples, aspects of the operations of 1815 may be performed by a decoding component as described with reference to FIGS. 10-13.

At 1820, the UE may deliver, to the MAC layer of the UE and based on the mode for processing the transport block, the one or more decoded bits of the one or more decoded code blocks in the first code block group before completing the decoding of the second code block group. The operations of 1820 may be performed according to the methods described herein. In some examples, aspects of the operations of 1820 may be performed by a delivering component as described with reference to FIGS. 10-13.

Figure 19:
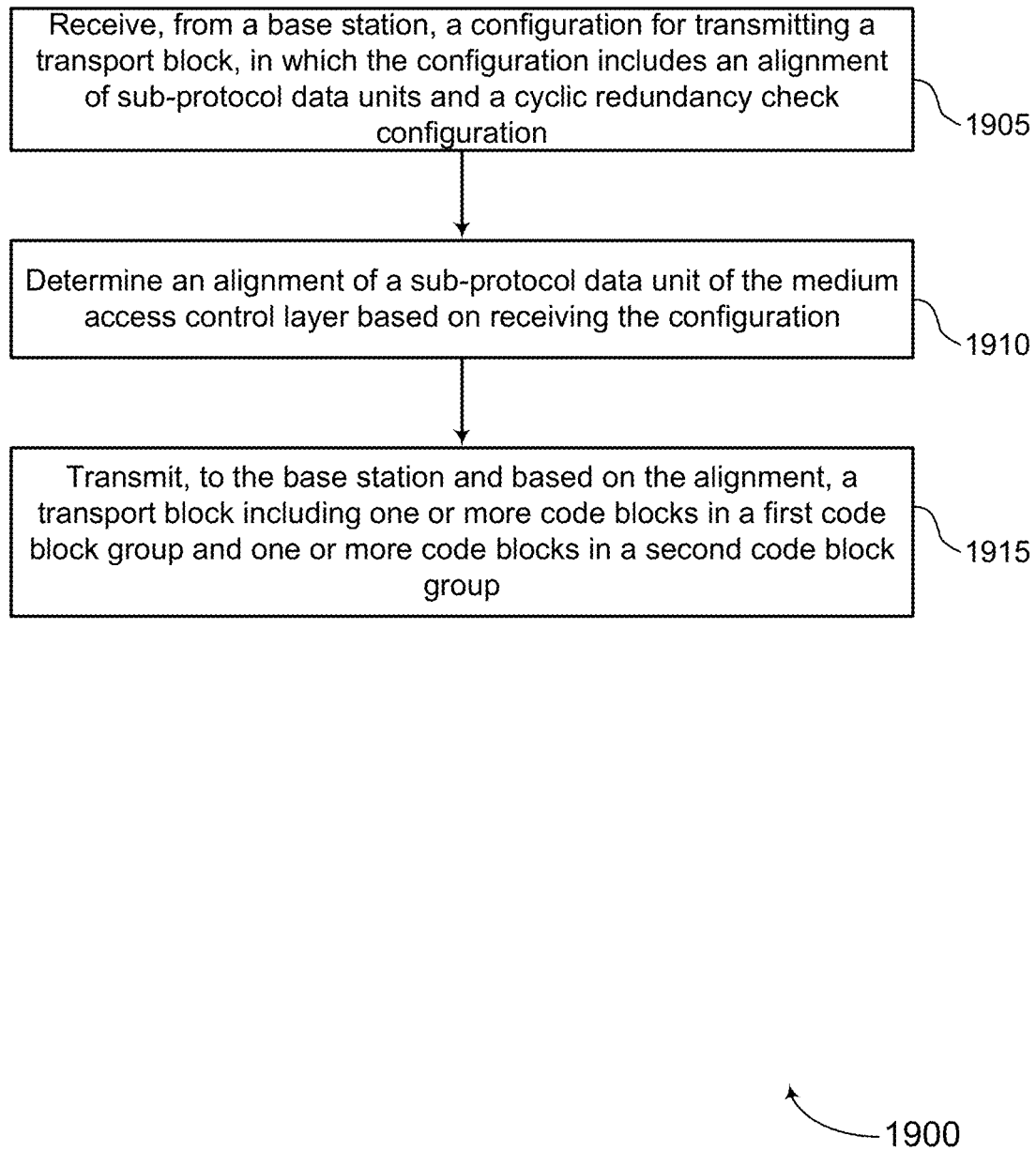

FIG. 19 shows a flowchart illustrating a method 1900 that supports data packet grouping for traffic awareness in NR in accordance with aspects of the present disclosure. The operations of method 1900 may be implemented by a UE 115 or its components. For example, the operations of method 1900 may be performed by a communications manager as described with reference to FIGS. 10-13. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, a configuration for transmitting a transport block, in which the configuration includes an alignment of sub-protocol data units and a cyclic redundancy check configuration. The operations of 1905 may be performed according to the methods described herein. In some examples, aspects of the operations of 1905 may be performed by an indication component as described with reference to FIGS. 10-13.

At 1910, the UE may determine an alignment of a sub-protocol data unit of the MAC layer based on receiving the configuration. The operations of 1910 may be performed according to the methods described herein. In some examples, aspects of the operations of 1910 may be performed by an alignment component as described with reference to FIGS. 10-13.

At 1915, the UE may transmit, to the base station and based on the alignment, a transport block including one or more code blocks in a first code block group and one or more code blocks in a second code block group. The operations of 1915 may be performed according to the methods described herein. In some examples, aspects of the operations of 1915 may be performed by a transport block component as described with reference to FIGS. 10-13.

Figure 20:
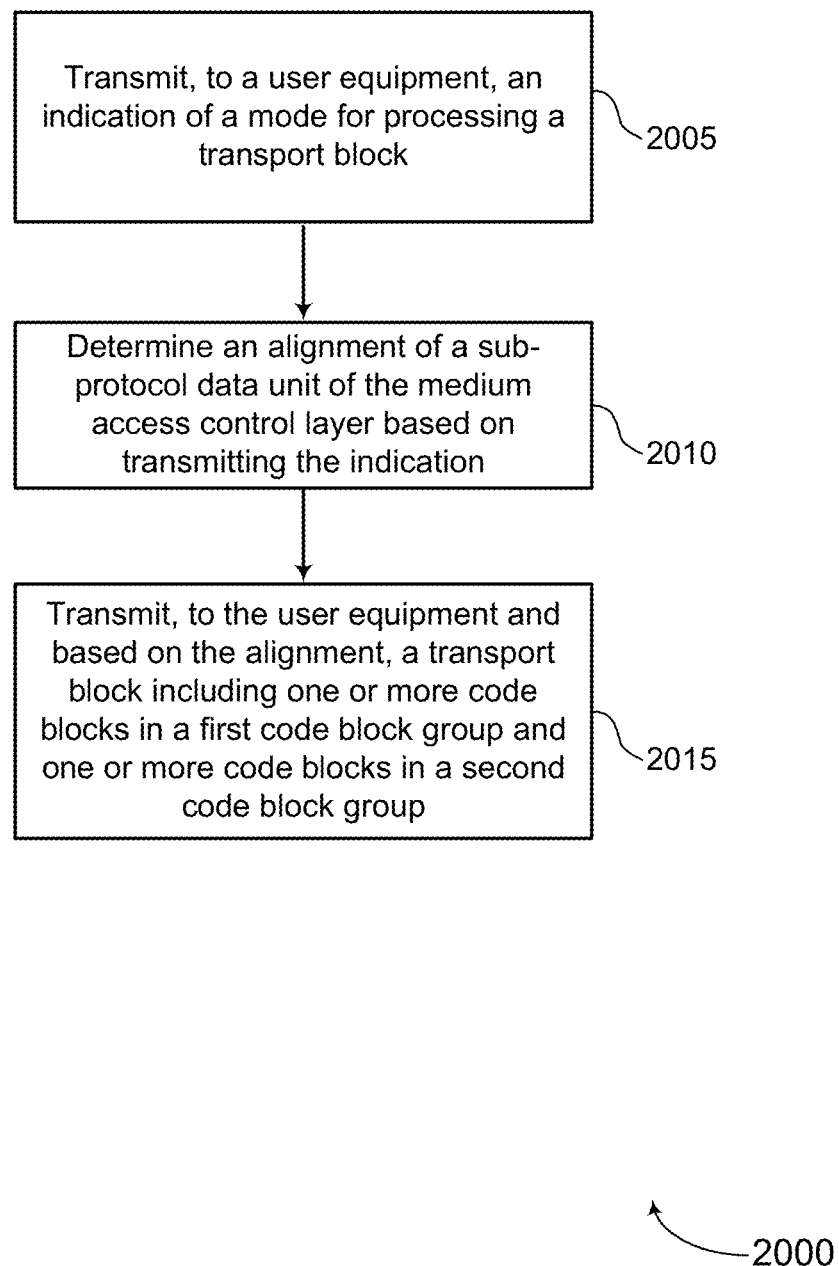

FIG. 20 shows a flowchart illustrating a method 2000 that supports data packet grouping for traffic awareness in NR in accordance with aspects of the present disclosure. The operations of method 2000 may be implemented by a base station 105 or its components. For example, the operations of method 2000 may be performed by a communications manager as described with reference to FIGS. 14-17. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, an indication of a mode for processing a transport block, in which the mode is associated with a rule set for delivering decoded code blocks to a MAC layer of the UE. The operations of 2005 may be performed according to the methods described herein. In some examples, aspects of the operations of 2005 may be performed by a mode transmission component as described with reference to FIGS. 14-17.

At 2010, the base station may determine an alignment of a sub-protocol data unit of the MAC layer based on transmitting the indication. The operations of 2010 may be performed according to the methods described herein. In some examples, aspects of the operations of 2010 may be performed by an alignment determination component as described with reference to FIGS. 14-17.

At 2015, the base station may transmit, to the UE and based on the alignment, a transport block including one or more code blocks in a first code block group and one or more code blocks in a second code block group. The operations of 2015 may be performed according to the methods described herein. In some examples, aspects of the operations of 2015 may be performed by a transport block transmission component as described with reference to FIGS. 14-17.

Figure 21:
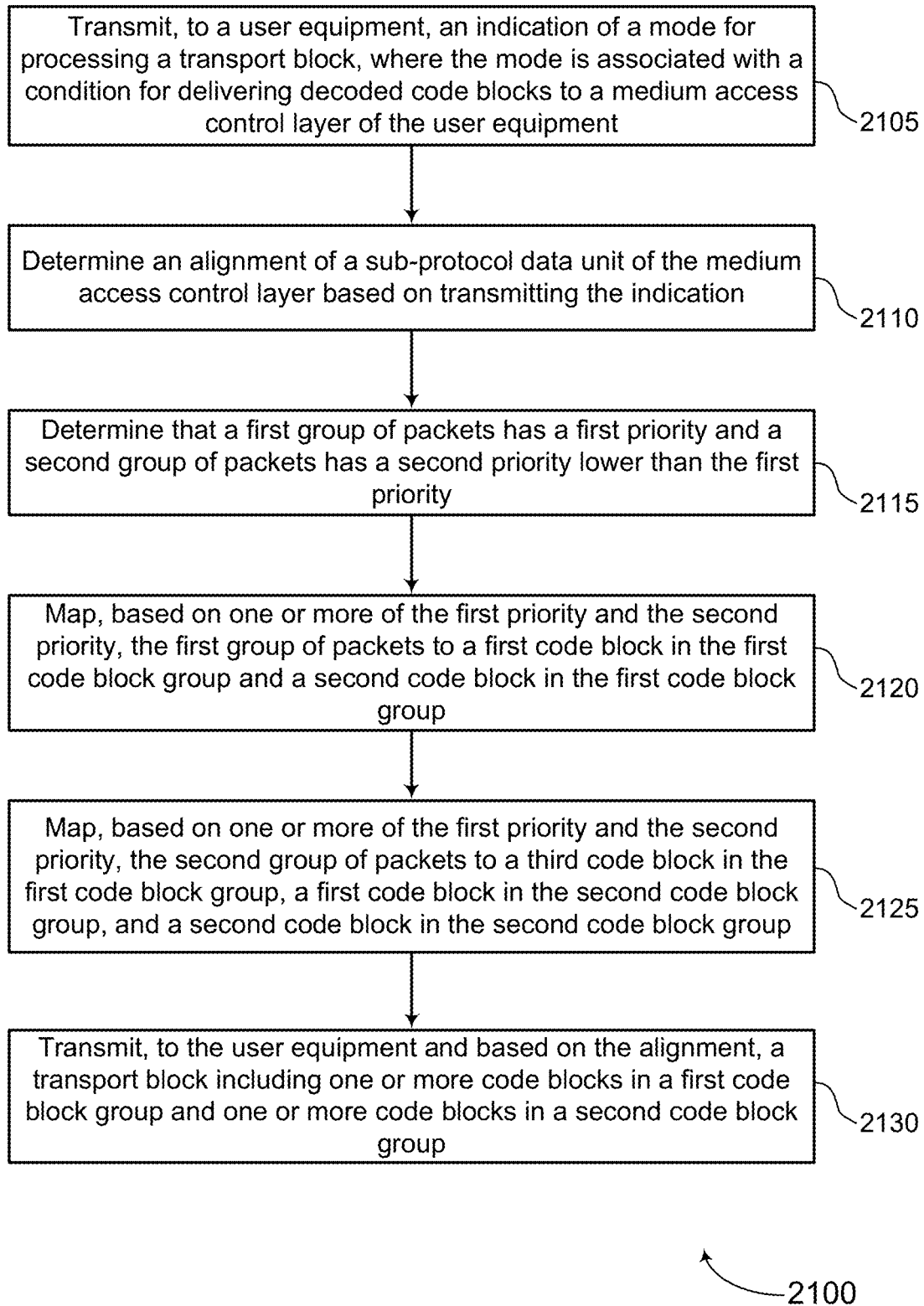

FIG. 21 shows a flowchart illustrating a method 2100 that supports data packet grouping for traffic awareness in NR in accordance with aspects of the present disclosure. The operations of method 2100 may be implemented by a base station 105 or its components. For example, the operations of method 2100 may be performed by a communications manager as described with reference to FIGS. 14-17. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, an indication of a mode for processing a transport block, in which the mode is associated with a rule set for delivering decoded code blocks to a MAC layer of the UE. The operations of 2105 may be performed according to the methods described herein. In some examples, aspects of the operations of 2105 may be performed by a mode transmission component as described with reference to FIGS. 14-17.

At 2110, the base station may determine an alignment of a sub-protocol data unit of the MAC layer based on transmitting the indication. The operations of 2110 may be performed according to the methods described herein. In some examples, aspects of the operations of 2110 may be performed by an alignment determination component as described with reference to FIGS. 14-17.

At 2115, the base station may determine that a first group of packets has a first priority and a second group of packets has a second priority lower than the first priority. The operations of 2115 may be performed according to the methods described herein. In some examples, aspects of the operations of 2115 may be performed by a priority determination component as described with reference to FIGS. 14-17.

At 2120, the base station may map, based on one or more of the first priority and the second priority, the first group of packets to a first code block in the first code block group and a second code block in the first code block group. The operations of 2120 may be performed according to the methods described herein. In some examples, aspects of the operations of 2120 may be performed by a mapping component as described with reference to FIGS. 14-17.

At 2125, the base station may map, based on one or more of the first priority and the second priority, the second group of packets to a third code block in the first code block group, a first code block in the second code block group, and a second code block in the second code block group, in which transmitting the transport block includes transmitting the first code block in the first code block group, the second code block in the first code block group, and the third code block in the first code block group. The operations of 2125 may be performed according to the methods described herein. In some examples, aspects of the operations of 2125 may be performed by a mapping component as described with reference to FIGS. 14-17.

At 2130, the base station may transmit, to the UE and based on the alignment, a transport block including one or more code blocks in a first code block group and one or more code blocks in a second code block group. The operations of 2130 may be performed according to the methods described herein. In some examples, aspects of the operations of 2130 may be performed by a transport block transmission component as described with reference to FIGS. 14-17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA). CDMA2000 covers IS-2000, IS-95, and IS-856 standards. IS-2000 Releases may be commonly referred to as CDMA2000 1x, 1x. IS-856 (TIA-856) is commonly referred to as CDMA2000 1xEV-DO, High Rate Packet Data (HRPD). UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (for example, several kilometers in radius) and may allow unrestricted access by UEs with service subscriptions with the network provider. A small cell may be associated with a lower-powered base station, as compared with a macro cell, and a small cell may operate in the same or different (for example, licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (for example, a home) and may provide restricted access by UEs having an association with the femto cell (for example, UEs in a closed subscriber group (CSG), UEs for users in the home, among other examples). An eNB for a macro cell may be referred to as a macro eNB. An eNB for a small cell may be referred to as a small cell eNB, a pico eNB, a femto eNB, or a home eNB. An eNB may support one or multiple (for example, two, three, four, among other examples) cells, and may also support communications using one or multiple component carriers.

The wireless communications system described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment, comprising:
    receiving, from a base station, an indication of a mode for processing a transport block, wherein the mode is associated with a rule set for delivering decoded code blocks to a medium access control layer of the user equipment;
    receiving, from the base station, the transport block comprising one or more code blocks in a first code block group and one or more code blocks in a second code block group;
    decoding the one or more code blocks in the first code block group of the transport block to decode one or more bits of the one or more code blocks in the first code block group;
    determining an alignment of a sub-protocol data unit of the medium access control layer within the first code block group, with a boundary of the first code block group, or within a code block; and
    delivering, to the medium access control layer of the user equipment and based at least in part on the mode for processing the transport block and based at least in part on determining the alignment of the sub-protocol data unit, the one or more decoded bits of the one or more decoded code blocks in the first code block group before completing the decoding of the second code block group.

2. The method of claim 1, further comprising transmitting an acknowledgement of the decoding of the one or more code blocks in the first code block group being successful, wherein delivering the one or more decoded bits of the one or more decoded code blocks in the first code block group is based at least in part on transmitting the acknowledgement.

3. The method of claim 1, wherein a first sub-protocol data unit of the medium access control layer comprises a first single group of bits to be processed together and a second sub-protocol data unit of the medium access control layer comprises a second single group of bits to be processed together.

4. The method of claim 1, wherein a first sub-protocol data unit of the medium access control layer and a second sub-protocol data unit of the medium access control layer are included in a single logical channel.

5. The method of claim 1, further comprising:
determining that the transport block comprises a plurality of code blocks; and
bypassing a cyclic redundancy check associated with the transport block based at least in part on determining that the transport block comprises the plurality of code blocks.

6. The method of claim 1, further comprising:
determining that a cyclic redundancy check value associated with the transport block is a fixed value; and
bypassing a cyclic redundancy check associated with the transport block based at least in part on determining that the cyclic redundancy check value associated with the transport block is the fixed value.

7. The method of claim 1, further comprising:
determining that the transport block comprises a plurality of code blocks;
determining an absence of a cyclic redundancy check value associated with the transport block based at least in part on determining that the transport block comprises the plurality of code blocks; and
bypassing a cyclic redundancy check associated with the transport block based at least in part on determining the absence of the cyclic redundancy check value associated with the transport block.

8. The method of claim 1, further comprising:
determining that the transport block comprises the one or more code blocks in the first code block group; and
determining a cyclic redundancy check value associated with the each of the one or more code blocks in the first code block group, wherein decoding the one or more code blocks in the first code block group is based at least in part on determining the cyclic redundancy check value associated with the each of the one or more code blocks in the first code block group.

9. The method of claim 1, further comprising determining a cyclic redundancy check value associated with the first code block group, wherein decoding the one or more code blocks in the first code block group is based at least in part on determining the cyclic redundancy check value.

10. The method of claim 9, further comprising:
bypassing a cyclic redundancy check associated with the transport block based at least in part on determining the cyclic redundancy check value associated with the first code block group, wherein delivering the one or more decoded bits of the one or more decoded code blocks in the first code block group is based at least in part on bypassing the cyclic redundancy check; or;
determining that a second cyclic redundancy check value associated with the transport block is a fixed value, wherein delivering the one or more decoded bits of the one or more decoded code blocks in the first code block group is based at least in part on the determining; or; and
determining an absence of the second cyclic redundancy check value associated with the transport block based at least in part on determining the cyclic redundancy check value associated with the first code block group, wherein delivering the one or more decoded bits of the one or more decoded code blocks in the first code block group is based at least in part on determining the absence of the second cyclic redundancy check value.

11. The method of claim 1, wherein delivering the one or more decoded bits of the one or more decoded code blocks in the first code block group is independent of determining a cyclic redundancy check value associated with the transport block.

12. The method of claim 1, further comprising:
receiving, from the base station, a second indication of a second mode for processing the transport block; and
delivering, to the medium access control layer of the user equipment and based at least in part on the second mode for processing the transport block, one or more decoded bits of a first code block before completing the decoding of a second code block.

13. The method of claim 1, further comprising:
decoding the one or more code blocks in the second code block group to decode one or more bits of the one or more code blocks in the second code block group; and
delivering, to the medium access control layer of the user equipment and based at least in part on the mode for processing the transport block, the one or more bits of the one or more decoded code blocks in the second code block group, wherein delivering the one or more decoded bits of the one or more decoded code blocks in the second code block group occurs after delivering the one or more decoded bits of the one or more decoded code blocks in the first code block group, and the one or more decoded code blocks in the first code block group and the one or more decoded code blocks in the second code block group comprises an entirety of the transport block.

14. The method of claim 1, wherein the indication of the mode comprises a radio resource control (RRC) signal or a downlink control information (DCI) signal.

15. A method for wireless communication at a base station, comprising:
transmitting, to a user equipment, an indication of a mode for processing a transport block, wherein the mode is associated with a rule set for delivering decoded code blocks to a medium access control layer of the user equipment;
aligning, based at least in part on transmitting the indication, a sub-protocol data unit of the medium access control layer within a first code block group of the transport block, with a boundary of the first code block group, or within a code block; and
transmitting, to the user equipment and based at least in part on aligning the sub-protocol data unit, the transport block comprising one or more code blocks in the first code block group and one or more code blocks in a second code block group.

16. The method of claim 15, further comprising receiving an acknowledgement of the decoding of the one or more code blocks in the first code block group being successful, wherein transmitting the transport block is based at least in part on receiving the acknowledgement.

17. The method of claim 15, further comprising:
determining that a first group of packets has a first priority and a second group of packets has a second priority lower than the first priority;
mapping, based at least in part on one or more of the first priority and the second priority, the first group of packets to the first code block group; and
mapping, based at least in part on one or more of the first priority and the second priority, the second group of packets to the first code block group and the second code block group, wherein transmitting the transport block comprises transmitting the first group of packets and the second group of packets.

18. The method of claim 15, further comprising:
mapping a first group of packets to the first code block group, wherein the first group of packets is aligned within the first code block group; and
mapping a second group of packets to the second code block group, wherein the second group of packets is aligned within the second code block group, and wherein transmitting the transport block comprises transmitting the first group of packets and the second group of packets, wherein the second group of packets has a first priority and the first group of packets has a second priority lower than the first priority.

19. The method of claim 15, further comprising:
mapping a first group of packets to the first code block group, wherein the first group of packets is aligned within the first code block group;
adding one or more padding bits in the first code block group, wherein the first group of packets is aligned within the first code block group based at least in part on adding the one or more padding bits; and
mapping a second group of packets to the second code block group, wherein transmitting the transport block comprises transmitting the first group of packets, the one or more padding bits, and the second group of packets.

20. The method of claim 15, further comprising:
mapping a first single group of bits to a first sub-protocol data unit of the medium access control layer; and
mapping a second single group of bits to a second sub-protocol data unit of the medium access control layer, wherein transmitting the transport block is based at least in part on mapping the first single group of bits and the second single group of bits.

21. The method of claim 15, further comprising determining a cyclic redundancy check configuration based at least in part on transmitting the indication of the mode for processing the transport block.

22. The method of claim 21, wherein determining the cyclic redundancy check configuration further comprises determining that a cyclic redundancy check value associated with the transport block is a fixed value, wherein transmitting the transport block is based at least in part on the determining.

23. The method of claim 21, wherein determining the cyclic redundancy check configuration further comprises:
determining that the transport block comprises a plurality of code blocks; and
refraining from indicating a cyclic redundancy check value associated with the transport block based at least in part on determining that the transport block comprises the plurality of code blocks.

24. The method of claim 21, wherein determining the cyclic redundancy check configuration further comprises:
determining that the transport block comprises the one or more code blocks in the first code block group; and
determining a cyclic redundancy check value associated with the each of the one or more code blocks in the first code block group, wherein transmitting the transport block is based at least in part on determining the cyclic redundancy check value associated with the each of the one or more code blocks in the first code block group.

25. The method of claim 21, wherein determining the cyclic redundancy check configuration further comprises:
determining a cyclic redundancy check value associated with the first code block group, wherein transmitting the transport block is based at least in part on determining the cyclic redundancy check value.

26. An apparatus for wireless communication at a user equipment, comprising:
a processor,
memory coupled with the processor; and
instructions stored in the memory and executable by the processor to cause the apparatus to:
receive, from a base station, an indication of a mode for processing a transport block, wherein the mode is associated with a rule set for delivering decoded code blocks to a medium access control layer of the user equipment;
receive, from the base station, the transport block comprising one or more code blocks in a first code block group and one or more code blocks in a second code block group;
decode the one or more code blocks in the first code block group of the transport block to decode one or more bits of the one or more code blocks;
determine an alignment of a sub-protocol data unit of the medium access control layer within the first code block group, with a boundary of the first code block group, or within a code block; and
deliver, to the medium access control layer of the user equipment and based at least in part on the mode for processing the transport block and based at least in part on determining the alignment of the sub-protocol data unit, the one or more decoded bits of the one or more decoded code blocks in the first code block group before completing the decoding of the second code block group.

27. The apparatus of claim 26, wherein the instructions are further executable to cause the apparatus to:
transmit an acknowledgement of the decoding of the one or more code blocks in the first code block group being successful, wherein delivering the one or more decoded bits of the one or more decoded code blocks in the first code block group is based at least in part on transmitting the acknowledgement.

28. An apparatus for wireless communication at a base station, comprising:
a processor,
memory coupled with the processor; and
instructions stored in the memory and executable by the processor to cause the apparatus to:
transmit, to a user equipment, an indication of a mode for processing a transport block, wherein the mode is associated with a rule set for delivering decoded code blocks to a medium access control layer of the user equipment;
aligning, based at least in part on transmitting the indication, a sub-protocol data unit of the medium access control layer within a first code block group of the transport block, with a boundary of the first code block group, or within a code block; and
transmit, to the user equipment and based at least in part on aligning the sub-protocol data unit, the transport block comprising one or more code blocks in the first code block group and one or more code blocks in a second code block group.

* * * * *